(12) United States Patent
Dai et al.

(10) Patent No.: US 12,153,195 B2
(45) Date of Patent: Nov. 26, 2024

(54) CAMERA LENS ASSEMBLY

(71) Applicant: ZHEJIANG SUNNY OPTICAL CO., LTD, Ningbo (CN)

(72) Inventors: Fujian Dai, Ningbo (CN); Saifeng Lyu, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 952 days.

(21) Appl. No.: 17/037,021

(22) Filed: Sep. 29, 2020

(65) Prior Publication Data
US 2021/0011260 A1 Jan. 14, 2021

Related U.S. Application Data

(63) Continuation of application No. PCT/CN2019/108448, filed on Sep. 27, 2019.

(30) Foreign Application Priority Data

Jan. 7, 2019 (CN) .......................... 201910011564.8

(51) Int. Cl.
*G02B 13/08* (2006.01)
*G02B 9/62* (2006.01)
*G02B 13/00* (2006.01)

(52) U.S. Cl.
CPC ........... *G02B 13/0045* (2013.01); *G02B 9/62* (2013.01); *G02B 13/08* (2013.01)

(58) Field of Classification Search
CPC .. G02B 13/0045; G02B 13/002; G02B 13/06; G02B 13/08; G02B 13/10; G02B 13/12; G02B 9/62; G02B 9/64; G02B 15/1465
See application file for complete search history.

(56) References Cited

U.S. PATENT DOCUMENTS

| | | | |
|---|---|---|---|
| 6,865,028 B2 * | 3/2005 | Moustier | H04N 23/58 359/725 |
| 7,095,563 B2 * | 8/2006 | Nurishi | G02B 13/08 359/671 |

(Continued)

FOREIGN PATENT DOCUMENTS

| CN | 202640578 U | * | 1/2013 |
|---|---|---|---|
| CN | 204556941 U | | 8/2015 |

(Continued)

OTHER PUBLICATIONS

Max Born and Emil Wolf, Principles of Optics, 4th Edition, (Pergamon Press 1970), pp. 161-164. (Year: 1970).*

(Continued)

*Primary Examiner* — Cara E Rakowski
*Assistant Examiner* — Wesley Scott Ashton
(74) *Attorney, Agent, or Firm* — HAUPTMAN HAM, LLP

(57) ABSTRACT

The present disclosure discloses a camera lens assembly. The camera lens assembly includes a first lens, a second lens, a third lens, a fourth lens, a fifth lens and a sixth lens, which all have refractive power and are sequentially arranged from an object side to an image side along an optical axis. The first lens and the sixth lens have negative refractive power; the third lens and the fifth lens have positive refractive power; at least one of the first lens to the sixth lens has a non-rotationally symmetric aspheric surface; wherein $\tan(FOVx/2)*\tan(FOVy/2)<2.0$, where FOVx is a full field-of-view of the camera lens assembly in an X-axis direction and FOVy is a full field-of-view of the camera lens assembly in a Y-axis direction, and values of FOVx and FOVy are different.

6 Claims, 11 Drawing Sheets

(56) References Cited

U.S. PATENT DOCUMENTS

| | | | | |
|---|---|---|---|---|
| 7,768,719 | B2* | 8/2010 | Jung | G02B 13/18 |
| | | | | 359/713 |
| 8,049,967 | B2* | 11/2011 | Hirose | G02B 13/08 |
| | | | | 359/671 |
| 9,022,563 | B2* | 5/2015 | Gupta | G02C 7/061 |
| | | | | 351/159.42 |
| 9,759,893 | B2* | 9/2017 | Jo | G02B 9/62 |
| 10,809,498 | B2* | 10/2020 | Kubota | G02B 13/06 |
| 11,493,732 | B2* | 11/2022 | Matsumura | G02B 9/64 |
| 11,619,804 | B2* | 4/2023 | Hsueh | G02B 13/04 |
| | | | | 359/713 |
| 11,867,966 | B2* | 1/2024 | Shobayashi | G02B 7/021 |
| 2008/0218690 | A1* | 9/2008 | Takeichi | B28D 1/143 |
| | | | | 351/159.75 |
| 2009/0073577 | A1* | 3/2009 | Jung | G02B 13/18 |
| | | | | 359/717 |
| 2014/0009844 | A1* | 1/2014 | Tsai | G02B 9/62 |
| | | | | 359/713 |
| 2016/0223797 | A1* | 8/2016 | Zhao | G02B 13/0045 |
| 2017/0219803 | A1* | 8/2017 | Lee | G02B 9/62 |
| 2019/0086638 | A1* | 3/2019 | Lee | H04N 23/687 |
| 2021/0109326 | A1* | 4/2021 | Jia | G02B 13/0045 |

FOREIGN PATENT DOCUMENTS

| | | | | |
|---|---|---|---|---|
| CN | 106526801 | A | | 3/2017 |
| CN | 107121756 | A | | 9/2017 |
| CN | 207488602 | U | | 6/2018 |
| CN | 108469669 | A | | 8/2018 |
| CN | 108614346 | A | | 10/2018 |
| CN | 109031608 | A | | 12/2018 |
| CN | 109100854 | A | * 12/2018 | ......... G02B 13/0045 |
| CN | 109541783 | A | | 3/2019 |
| CN | 209343028 | U | | 9/2019 |
| JP | 2001124990 | A | | 5/2001 |
| JP | 2014109764 | A | | 6/2014 |
| JP | 2014134702 | A | | 7/2014 |
| KR | 20100000758 | A | * | 1/2010 |
| WO | WO-2020017258 | A1 | * 1/2020 | ............. G02B 13/08 |

OTHER PUBLICATIONS

Bjorn Petersen, Optical Anomalies and Lens Corrections Explained, 2016, pp. 1-17 [online], [retrieved Aug. 2, 2023], retrieved from the Internet <URL: https://www.bhphotovideo.com/explora/photography/tips-and-solutions/optical-anomalies-and-lens-corrections-explained>. (Year: 2016).*

Wagner Lungov, Focal Length and Image Circle, 2016, pp. 1-8 [online], [retrieved Aug. 2, 2023], retrieved from the Internet <URL: https://apenasimagens.com/en/focal-length-image-circle/>. (Year: 2016).*

Michel Thoby, How is Lens Distortion Value Being Defined by the Industry and by some International Standardization Groups, 2018, pp. 1-8 [online], [retrieved Aug. 1, 2023], retrieved from Internet <URL: http://michel.thoby.free.fr/Fisheye_history_short/International_Standards_about_Distortion.html>. (Year: 2018).*

F.E. Sahin et al., Distortion Optimization for Wide-angle Computational Cameras, 5 Optics Express 5478-5487 (2018) (Year: 2018).*

Machine generated translation by Patent Translate of CN 108614346 A, with corresponding Espacenet Bibliographic data, compiled with CN 108614346 A. (Year: 2023).*

Jonny Gauvin et al., Development of New Family of Wide-angle Anamorphic Lens with Controlled Distortion Profile, 5874 Proceedings of SPIE 587404-1 to 587404-12 (2005). (Year: 2005).*

Adrian Stern et al., Anamorphic Optics for Compressive Imaging and Compressive Motion Tracking, 2012, pp. 1-3 [online], [retrieved Jan. 31, 2024], retrieved from the Internet <URL: ttps://ieeexplore.ieee.org/stamp/stamp.jsp?tp=&arnumber=6488925>. (Year: 2012).*

Songtao Wang et al., Morphology Optimization Method for Machined Surface of Hardened Steel, 7 International Journal of Control and Automation 25-34 (2014). (Year: 2014).*

Lenny Lipton et al., A Stereoscopic Lens for Digital Cinema Cameras, 9391 Proceedings of SPIE 939107-1 to 939107-7 (2015). (Year: 2015).*

Chang-Feng Yao at al., Influence of Cutter Orientations on Cutting Force . . . , 2016, pp. 1-7 [online], [retrieved Jan. 29, 2024], retrieved from Internet <URL: https://www.researchgate.net/publication/326488419_Influence_of_Cutter_Orientations_on_Cutting_Force_in_Ball_End_Milling_of_TC17>. (Year: 2016).*

Machine English Translation from Patent Translate for CN108469669 A with CN108469669 A. (Year: 2024).*

Getting Started with Anamorphic Lenses for DSLR, 2016, pp. 1-11 [online], [retrieved May 22, 2024], retrieved from the Internet <URL: https://www.anamorphicstore.com/anamorphic-lenses-dslr/>. (Year: 2016).*

Cylinder Lenses, 2017, pp. 1-2 [online], [retrieved May 23, 2024], retrieved from the Internet <URL: https://www.electrooptics.com/sites/default/files/content/white-paper/pdfs/Cylinder-Lenses_Whitepaper_17_EN_1.pdf>. (Year: 2017).*

Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7508-1242-4/chapter/bk978-0-7503-1242-4ch1.pdf>. (Year: 2017).*

Machine English Translation of CN 209343028 U obtained from Patent Translate (Year: 2024).*

Office Action issued in corresponding Indian Patent Application No. 202017043531; mailed Dec. 2, 2021; 5 pgs.

International Search Report issued in corresponding International Application No. PCT/CN2019/108448, mailed Dec. 27, 2019, pp. 1-2, China National Intellectual Property Administration, Beijing, China.

* cited by examiner

CAMERA LENS ASSEMBLY

CROSS-REFERENCE TO RELATED APPLICATIONS

This application is a continuation of International Application No. PCT/CN2019/108448, filed on Sep. 27, 2019, which claims the priority to Chinese Patent Application No. 201910011564.8 filed with the China National Intellectual Property Administration (CNIPA) on Jan. 7, 2019. The aforementioned patent applications are hereby incorporated by reference in their entireties.

TECHNICAL FIELD

The present disclosure relates to a camera lens assembly, and more specifically to a camera lens assembly including six lenses.

BACKGROUND

With the rapid development of smart electronic devices, such as mobile phones, computers and tablets, it is required for camera lens assemblies of these products to have higher and higher performance. In addition to a high resolution and a large aperture, it is also required that the camera lens assemblies shall all have excellent image quality within a wide field-of-view. However, the larger the angle of field-of-view of a camera lens assembly is, the more serious TV distortion of a captured image would be.

At the same time, wide-angle lens assemblies on current popular mobile phones mostly use a six-lens structure, and each lens mostly uses a rotationally symmetric (axisymmetric) aspheric surface. This kind of rotationally symmetric aspheric surface may be regarded as being formed by rotating a curve in the meridian plane 360° around an optical axis, therefore, it only has sufficient freedom in the meridian plane, but cannot well correct off-axis aberrations. In addition, the rotationally symmetric aspheric surface does not contribute substantially to the TV distortion correction of the wide-angle lens assemblies.

SUMMARY

The present disclosure provides such a camera lens assembly that may be applied to portable electronic products and may at least solve or partially solve at least one of the above mentioned disadvantages in the existing technology, such as a wide-angle small distortion camera lens assembly.

In one aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. A maximum value TDT of TV distortion within an imaging range of the camera lens assembly may satisfy: $|TDT| \leq 2.5\%$.

In one embodiment, an object-side surface of the second lens may be a convex surface, and an image-side surface of the second lens may be a concave surface; and an object-side surface of the fourth lens may be a concave surface.

In one embodiment, an image height IHx of the camera lens assembly in an X-axis direction and an image height IHy of the camera lens assembly in a Y-axis direction may satisfy: $\sqrt{IH_x^2 + IH_y^2} \leq 6.0$ mm.

In one embodiment, an image-side surface of the sixth lens is a non-rotationally symmetric aspheric surface; and a processing inclination angle θ of the image-side surface of the sixth lens may satisfy: θ<72°.

In one embodiment, an effective focal length fy2 of the second lens in a Y-axis direction and an effective focal length fy3 of the third lens in the Y-axis direction may satisfy: 3.0<fy2/fy3<5.0.

In one embodiment, an effective focal length fx5 of the fifth lens in an X-axis direction and an effective focal length fx6 of the sixth lens in the X-axis direction may satisfy: −0.5<fx5/fx6<0.

In one embodiment, an effective focal length fy1 of the first lens in a Y-axis direction and an effective focal length fy2 of the second lens in the Y-axis direction may satisfy: −0.5<fy1/fy2<0.

In one embodiment, an object-side surface of the first lens may be a concave surface; and an effective focal length fy of the camera lens assembly in a Y-axis direction and a radius of curvature R1 of the object-side surface of the first lens may satisfy: −1.0<fy/R1<0.

In one embodiment, a full field-of-view FOVx of the camera lens assembly in an X-axis direction and a full field-of-view FOVy of the camera lens assembly in a Y-axis direction may satisfy: tan(FOVx/2)*tan(FOVy/2)<2.0.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. An effective focal length fx5 of the fifth lens in an X-axis direction and an effective focal length fx6 of the sixth lens in the X-axis direction may satisfy: −0.5<fx5/fx6<0.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. An object-side surface of the second lens may be a convex surface, and an image-side surface of the second lens may be a concave surface; and an object-side surface of the fourth lens may be a concave surface.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. An image-side surface of the sixth lens is a non-rotationally symmetric aspheric surface; and a processing inclination angle θ of the image-side surface of the sixth lens may satisfy: θ<72°.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. An image height IHx of the camera lens assembly in an X-axis direction and an image height IHy of the camera lens assembly in a Y-axis direction may satisfy: $\sqrt{IH_x^2+IH_y^2} \leq 6.0$ mm.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. An effective focal length fy2 of the second lens in a Y-axis direction and an effective focal length fy3 of the third lens in the Y-axis direction may satisfy: 3.0<fy2/fy3<5.0.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. An effective focal length fy1 of the first lens in a Y-axis direction and an effective focal length fy2 of the second lens in the Y-axis direction may satisfy: −0.5<fy1/fy2<0.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. An object-side surface of the first lens may be a concave surface; and an effective focal length fy of the camera lens assembly in a Y-axis direction and a radius of curvature R1 of the object-side surface of the first lens may satisfy: −1.0<fy/R1<0.

In another aspect, the present disclosure provides a camera lens assembly including a first lens, a second lens, a third lens, a fourth lens, a fifth lens and a sixth lens, which all have refractive power and are sequentially arranged from an object side to an image side along an optical axis. The first lens and the sixth lens may have negative refractive power; the third lens and the fifth lens may have positive refractive power; and at least one of the first lens to the sixth lens may have a non-rotationally symmetric aspheric surface. A full field-of-view FOVx of the camera lens assembly in an X-axis direction and a full field-of-view FOVy of the camera lens assembly in a Y-axis direction may satisfy: tan(FOVx/2)*tan(FOVy/2)<2.0.

In the present disclosure, a plurality of lenses (e.g., six lenses) are used. By reasonably configuring the refractive power, surface types of the lenses, center thickness of each lens, on-axis spacing between each two of the lenses, the above mentioned camera lens assembly has at least one advantage such as wide angle, small distortion, high imaging plane brightness and high image quality for imaging. In addition, by introducing the non-rotationally symmetric aspheric surface, an off-axis meridian aberration and a sagittal aberration of the camera lens assembly can be corrected at the same time, which reduces the TV distortion of actual imaging of the camera lens assembly, thereby further improving the image quality.

BRIEF DESCRIPTION OF THE DRAWINGS

After reading detailed descriptions of non-limiting embodiments with reference to the accompanying drawings, other features, objectives and advantages of the present disclosure will become more apparent. In the accompanying drawings.

DETAILED DESCRIPTION OF EMBODIMENTS

Figure 1:
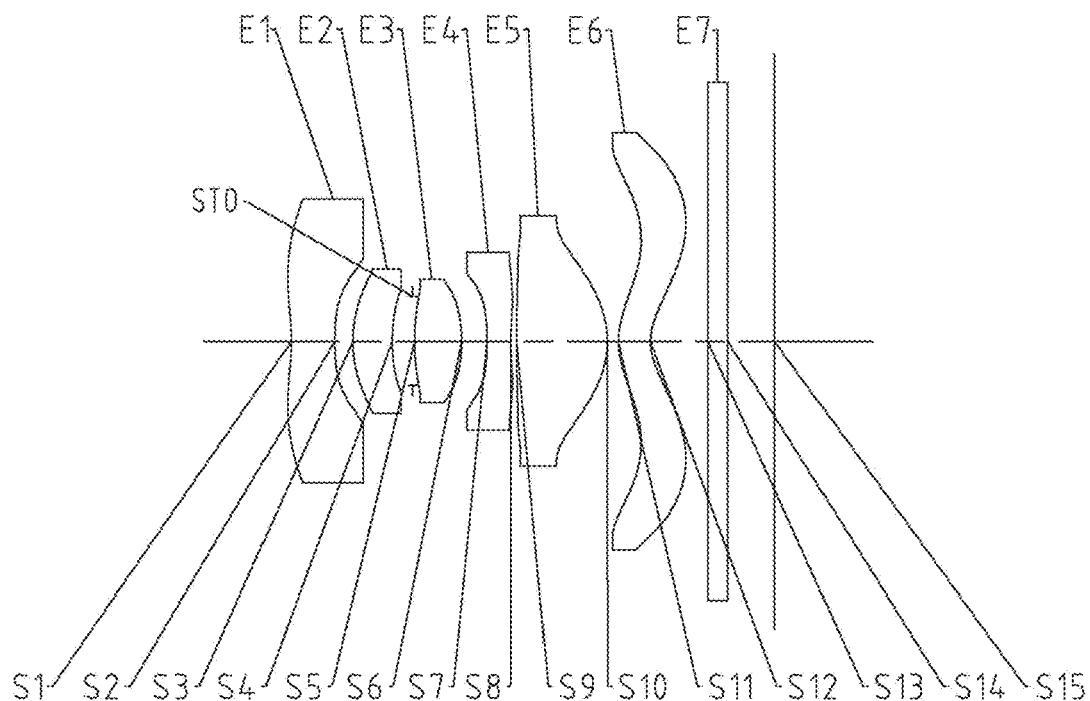
FIG. 1 illustrates a schematic structural diagram of a camera lens assembly according to Example 1 of the present disclosure.

To facilitate understanding the claimed solutions of the present disclosure, various aspects of the present disclosure will be described in more detail with reference to the accompanying drawings. It should be understood that the detailed description is merely illustrative of exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without introducing any limitation on the corresponding features. Thus, a first lens below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the those shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial area; and if a surface of a lens is a concave surface and the position of the concave is not defined, it indicates that the surface of the lens is concave at least in the paraxial area. In each lens, the surface closest to the object is referred to as an object-side surface of the lens, and the surface closest to the imaging plane is referred to as an image-side surface of the lens.

Herein, for the convenience of description, we define an X-Y-Z rectangular coordinate system where the X, Y, and Z axes are perpendicular to each other. In this rectangular coordinate system, the origin is located on the optical axis of a camera lens assembly, the Z axis coincides with the optical axis, the X-axis is perpendicular to the Z axis and located in the sagittal plane, and the Y-axis is perpendicular to the Z axis and located in the meridian plane. In addition, the term "processing inclination angle" is defined as a processing angle of a surface of a lens along the direction of the angular bisector of the X-axis and the Y-axis.

However, it should be understood that the "X-axis direction", "Y-axis direction" and "Z-axis direction" mentioned herein only refer to directions parallel to the X-axis, Y-axis and Z-axis of the rectangular coordinate system, respectively, rather than being limited to the three axes of the rectangular coordinate system. Unless otherwise specified, parameter symbols in this disclosure represent characteristic parameter values along the Y-axis direction of the camera lens assembly. For example, unless otherwise specified, R1 in the conditional expression "fy/R1" represents the radius of curvature of an object-side surface of the first lens in the Y-axis direction.

It should be further understood that the terms "comprising/comprise", "including/include", "having/have", and "containing/contain", when used in this disclosure, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. Characteristics, principles and other aspects of the present disclosure will be described below in detail.

The camera lens assembly according to the exemplary embodiments of the present disclosure may have, for example, six lenses having refractive power, i.e., a first lens, a second lens, a third lens, a fourth lens, a fifth lens and a sixth lens. These six lenses are arranged in sequence along the optical axis from an object side to an image side. There may be an air spacing between adjacent lenses.

In an exemplary embodiment, the first lens may have negative refractive power. The second lens may have positive refractive power or negative refractive power. The third lens may have positive refractive power. The fourth lens may have positive refractive power or negative refractive power. The fifth lens may have positive refractive power. The sixth lens may have negative refractive power. Satisfying the above refractive power distribution is beneficial to slow down a deflection angle of light, so as to use the principle of reverse telephoto to increase field-of-view, especially compared with a telephoto structure of the first lens using a positive lens, the negative refractive power of the first lens may make it easier for the system to increase the field-of-view.

In addition, the image quality may be further improved by setting the object-side surface and/or the image-side surface of at least one of the first lens to the sixth lens as a non-rotationally symmetric aspheric surface. The non-rotationally symmetric aspheric surface is a free-form surface. On the basis of the rotationally symmetric aspheric surface, a non-rotationally symmetric component is added. Therefore, the introduction of the non-rotationally symmetric aspheric surface in the lens system is beneficial to effectively correct the off-axis meridian aberration and sagittal aberration, and greatly improve the performance of an optical system. In addition, introducing the non-rotationally symmetric aspheric surface may also achieve the purpose of reducing TV distortion. Alternatively, an image-side surface of the sixth lens may be a non-rotationally symmetric aspheric surface.

In an exemplary embodiment, an object-side surface of the second lens may be a convex surface, and an image-side surface of the second lens may be a concave surface; and an object-side surface of the fourth lens may be a concave surface. Reasonable configuration of the surface types of the second lens and the fourth lens to form a Quasi-Double Gauß may help improve aberrations of a wide-angle lens assembly and improve the image quality of the optical system; at the same time, the change in the shape of the sixth lens is beneficial to match a chip chief ray angle of and prevent color deviation. Alternatively, the second lens may have positive refractive power; and the fourth lens may have negative refractive power and an image-side surface of the fourth lens may be a concave surface.

In an exemplary embodiment, an object-side surface of the third lens may be a convex surface, and an image-side surface of the third lens may be a convex surface.

In an exemplary embodiment, an image-side surface of the fifth lens may be a convex surface.

In an exemplary embodiment, an object-side surface of the sixth lens may be a convex surface, and an image-side surface of the sixth lens may be a concave surface.

In an exemplary embodiment, the camera lens assembly of the present disclosure may satisfy the conditional expression: $|TDT| \leq 2.5\%$, where TDT is a maximum value of TV distortion in an imaging range of the camera lens assembly. Satisfying the conditional expression $|TDT| \leq 2.5\%$ is beneficial to reduce actual imaging distortion of large field-of-view lens assembly.

In an exemplary embodiment, the camera lens assembly of the present disclosure may satisfy the conditional expression: $\theta < 72°$, where $\theta$ is a processing inclination angle of the image-side surface of the sixth lens. Limiting the processing inclination angle of the image-side surface of the sixth lens helps to ensure the processing feasibility and processing accuracy of the sixth lens. In addition, it may also ensure the detection accuracy and prevent ineffective detection due to an excessive large processing inclination angle.

In an exemplary embodiment, the camera lens assembly of the present disclosure may satisfy the conditional expression: $\sqrt{IH_x^2 + IH_y^2} \leq 6.0$ mm, where IHx is an image height of the camera lens assembly in an X-axis direction, and IHy is an image height of the camera lens assembly in a Y-axis direction. More specifically, IHx and IHy may further satisfy: $3.01 \text{ mm} \leq \sqrt{IH_x^2 + IH_y^2} \leq 6.0$ mm. The conditional expression $\sqrt{IH_x^2 + IH_y^2} \leq 6.0$ mm may ensure that the camera lens assembly has a super large imaging plane and achieve super high pixels; at the same time, matching the chip shape for design and is also conducive to the realization of deviation correction in an AA process (i.e., active alignment).

In an exemplary embodiment, the camera lens assembly of the present disclosure may satisfy the conditional expression: $3.0 < fy2/fy3 < 5.0$, where fy2 is an effective focal length of the second lens in a Y-axis direction and fy3 is an effective focal length of the third lens in the Y-axis direction. More specifically, fy2 and fy3 may further satisfy: $2.77 \leq fy2/fy3 \leq 4.60$. Controlling the effective focal lengths of the second lens and the third lens in the Y-axis direction to form a Quasi-Double Gauß is beneficial to eliminate aberrations of the optical system, and cooperate with the first lens and the fourth lens, the combined refractive power is relatively close, which may effectively eliminate the aberrations and improve an optical modulation transfer function (MTF) and other performance.

In an exemplary embodiment, the camera lens assembly of the present disclosure may satisfy the conditional expression: $-0.5 < fx5/fx6 < 0$, where fx5 is an effective focal length of the fifth lens in an X-axis direction and fx6 is an effective focal length of the sixth lens in the X-axis direction. More specifically, fx5 and fx6 may further satisfy: $-0.4 \leq fx5/fx6 \leq -0.1$, for example, $-0.35 \leq fx5/fx6 \leq -0.21$. Since the fifth lens and/or the sixth lens are designed with free-form surfaces, they are non-rotationally symmetric in the X-axis direction and the Y-axis direction, which is beneficial to achieve the purpose of reducing TV distortion.

In an exemplary embodiment, the camera lens assembly of the present disclosure may satisfy the conditional expression: $-0.5 < fy1/fy2 < 0$, where fy1 is an effective focal length of the first lens in a Y-axis direction and fy2 is an effective focal length of the second lens in the Y-axis direction. More specifically, fy1 and fy2 may further satisfy: $-0.5 < fy1/fy2 < -0.2$, for example, $-0.46 \leq fy1/fy2 \leq -0.39$. Satisfying the conditional expression $-0.5 < fy1/fy2 < 0$ helps to slow down light deflection and reduce the sensitivity of the first lens; on the other hand, it also helps to ensure the compactness of a lens structure and improve the image quality of an edge field-of-view.

In an exemplary embodiment, an object-side surface of the first lens is a concave surface; and the camera lens assembly of the present disclosure may satisfy the conditional expression: $-1.0 < fy/R1 < 0$, where fy is an effective focal length of the camera lens assembly in a Y-axis direction and R1 is a radius of curvature of the object-side surface of the first lens. More specifically, fy and R1 may further satisfy: $-1.0 < fy/R1 < -0.5$, for example, $-0.90 \leq fy/R1 \leq -0.55$. Satisfying the conditional expression $-1.0 < fy/R1 < 0$ is conducive to reducing a first lens diameter of a wide-angle lens assembly, and on the other hand, it may also increase the field-of-view of the lens assembly, while also taking into account aesthetic appearance and consistency effect of multi-camera lens assembly. Alternatively, an image-side surface of the first lens may be a concave surface.

In an exemplary embodiment, the camera lens assembly of the present disclosure may satisfy the conditional expression: $\tan(FOVx/2)*\tan(FOVy/2) < 2.0$, where FOVx is a full field-of-view of the camera lens assembly in an X-axis direction and FOVy is a full field-of-view of the camera lens assembly in a Y-axis direction. More specifically, FOVx and FOVy may further satisfy: $0 < \tan(FOVx/2)*\tan(FOVy/2) < 1.5$, for example, $0.14 \leq \tan(FOVx/2)*\tan(FOVy/2) \leq 1.45$. Satisfying the conditional expression $\tan(FOVx/2)*\tan(FOVy/2) < 2.0$ may ensure that a shooting range of the camera lens assembly is wide enough, and help to achieve a "fish-eye" lens assembly effect in a small distortion state.

In an exemplary embodiment, the camera lens assembly described above may further include a stop to improve the image quality of the lens assembly. Alternatively, the stop may be provided between the second lens and the third lens.

Alternatively, the camera lens assembly described above may further include an optical filter for correcting the color deviation and/or a protective glass for protecting a photo-sensitive element located on the imaging plane.

The camera lens assembly according to the above embodiments of the present disclosure may employ a plurality of lenses, such as six lenses as described above. By properly configuring the refractive power of each lens, the surface shape, the center thickness of each lens, and the on-axis spacing between the lenses, the size of the lens assembly may be effectively reduced, the sensitivity of the lens assembly may be reduced and the processability of the lens assembly may be improved, such that the camera lens assembly is more advantageous for production processing and may be applied to portable electronic products. In addition, by introducing the non-rotationally symmetric aspheric surface, an off-axis meridian aberration and sagittal aberration of the camera lens assembly are corrected, which may ensure the brightness of the imaging plane to further improve the image quality, and at the same time achieve the purpose of reducing the TV distortion, such that the camera lens assembly has the characteristics of wide-angle and small distortion.

In the embodiments of the present disclosure, the mirror surface of each lens is mostly an aspheric mirror surface. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Alternatively, at least one of the object-side surface and the image-side surface of each of the first lens, the second lens, the third lens, the fourth lens, the fifth lens and the sixth lens are aspheric surfaces. Alternatively, the object-side surface and the image-side surface of each of the first lens, the second lens, the third lens, the fourth lens, the fifth lens and the sixth lens may be aspheric surface.

However, it should be understood by those skilled in the art that the number of lenses constituting the camera lens assembly may be varied to achieve the various results and advantages described in this specification without departing from the technical solution claimed by the present disclosure. For example, although the embodiment is described by taking six lenses as an example, the camera lens assembly is not limited to include six lenses. The camera lens assembly may also include other numbers of lenses if desired.

Some specific examples of the camera lens assembly applicable to the above embodiments will be further described below with reference to the accompanying drawings.

Example 1

A camera lens assembly according to Example 1 of the present disclosure is described below with reference to FIG. 1 to FIG. 3. FIG. 1 illustrates a schematic structural diagram of the camera lens assembly according to Example 1 of the present disclosure.

As shown in FIG. 1, the camera lens assembly according to an exemplary embodiment of the present disclosure includes, sequentially along an optical axis from an object side to an image side: a first lens E1, a second lens E2, a stop STO, a third lens E3, a fourth lens E4, a fifth lens E5, a sixth lens E6, an optical filter E7, and an imaging plane S15.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 1 shows the surface type, the radius of curvature X, the radius of curvature Y, the thickness, the material, the conic coefficient X and the conic coefficient Y of each lens of the camera lens assembly in Example 1. The radius of curvature X, the radius of curvature Y and the thickness are shown in millimeters (mm).

TABLE 1

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | spherical | infinite | | infinite | | | | |
| S1 | aspheric | −1.9909 | | 0.4557 | 1.54 | 55.7 | −27.4673 | |
| S2 | aspheric | 4.4275 | | 0.1902 | | | −15.8034 | |
| S3 | aspheric | 1.4375 | | 0.4139 | 1.65 | 23.5 | 0.4182 | |
| S4 | aspheric | 1.9465 | | 0.2147 | | | 2.8899 | |
| STO | spherical | infinite | | 0.0200 | | | | |
| S5 | aspheric | 2.5076 | | 0.4950 | 1.55 | 56.1 | −0.8458 | |
| S6 | aspheric | −1.6041 | | 0.2662 | | | 1.3371 | |
| S7 | aspheric | −5.0788 | | 0.2500 | 1.67 | 20.4 | 43.5302 | |
| S8 | aspheric | 2.4317 | | 0.0600 | | | −81.0867 | |
| S9 | aspheric | 25.7164 | | 0.9502 | 1.55 | 56.1 | −99.0000 | |
| S10 | aspheric | −0.9925 | | 0.1141 | | | −0.5300 | |
| S11 | aspheric | 0.7937 | | 0.3376 | 1.54 | 55.7 | −4.0228 | |
| S12(AAS) | aspheric | 0.5751 | 0.5749 | 0.6024 | | | −2.6011 | −2.6074 |
| S13 | aspheric | infinite | | 0.2100 | 1.52 | 64.2 | | |
| S14 | aspheric | infinite | | 0.4908 | | | | |
| S15 | spherical | infinite | | | | | | |

It should be understood that the "radius of curvature X" and "conic coefficient X" that are not specifically marked (blank) in the above table are consistent with the corresponding values of the "radius of curvature Y" and "conic coefficient Y". This is similar in the following embodiments.

As can be seen from Table 1, the object-side surface and the image-side surface of any one of the first lens E1, the second lens E2, the third lens E3, the fourth lens E4 and the fifth lens E5, and the object-side surface S11 of the sixth lens E6 are aspheric surfaces. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

where, x is the distance sagittal height to the vertex of the aspheric surface when the aspheric surface is at a position of a height h along the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the $i^{th}$ order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$, which are applicable to each aspheric surface S1-S11 in example 1.

$$z = \frac{(C_x * X^2 + C_y * Y^2)}{1+\sqrt{1-(1+K_x)*C_x^2*X^2-(1+K_y)*C_y^2*Y^2}} + \quad (2)$$

$$AR*((1-AP)*X^2+(1+AP)*Y^2)^2 +$$

$$BR*((1-BP)*X^2+(1+BP)*Y^2)^3 +$$

$$CR*((1-CP)*X^2+(1+CP)*Y^2)^4 +$$

$$DR*((1-DP)X^2+(1+DP)*Y^2)^5 +$$

$$ER*((1-EP)*X^2+(1+EP)*Y^2)^6 +$$

$$FR*((1-FP)X^2+(1+FP)*Y^2)^7 +$$

$$GR*((1-GP)X^2+(1+GP)*Y^2)^8 +$$

$$HR*((1-HP)X^2+(1+HP)*Y^2)^9 + JR*((1-JP)X^2+(1+JP)*Y^2)^{10}$$

where, z is the sagittal height of the surface parallel to the Z axis; Cx and Cy are the curvatures of the vertices of the surface in the X and Y directions (=1/radius of curvature) respectively; Kx and Ky are the conic coefficients in the X and Y directions respectively; AR, BR, CR, DR, ER, FR, GR, HR, JR are the $4^{th}$, $6^{th}$, $8^{th}$, $10^{th}$, $12^{th}$, $14^{th}$, $16^{th}$, 18th and 20th order coefficients of the aspheric rotationally symmetric components, respectively; AP, BP, CP, DP, EP,

TABLE 2

| Surface number | A4 | A6 | A8 | A10 | A12 |
|---|---|---|---|---|---|
| S1 | 3.7873E−01 | −6.5704E−02 | 1.6266E−02 | −5.0014E−03 | 1.3326E−03 |
| S2 | 2.7162E−01 | −4.4550E−02 | 3.1551E−03 | −1.5594E−03 | 3.0317E−04 |
| S3 | −3.2474E−03 | −1.3683E−02 | 6.6793E−04 | −1.6358E−04 | 1.4671E−04 |
| S4 | 1.6209E−02 | 2.1782E−03 | 8.7444E−04 | 2.2928E−04 | 9.0479E−05 |
| S5 | 4.1975E−04 | −3.9445E−04 | −5.6657E−05 | 3.0201E−06 | −7.1351E−06 |
| S6 | −5.5444E−02 | −9.9131E−04 | −3.6195E−04 | 4.0684E−05 | 2.5237E−06 |
| S7 | −1.6191E−01 | 2.1206E−02 | −5.9565E−04 | 1.0877E−04 | 1.6857E−04 |
| S8 | −1.2269E−01 | 2.8370E−02 | 3.2517E−04 | −1.5529E−03 | 1.1545E−03 |
| S9 | 1.1339E−02 | 1.5853E−03 | 5.5950E−03 | −5.3417E−03 | 2.5751E−03 |
| S10 | 5.5174E−01 | 9.6116E−02 | 8.7529E−03 | −1.7412E−03 | −2.3852E−03 |
| S11 | −1.2202E+00 | 2.3608E−01 | −1.6147E−02 | 5.3917E−03 | 8.2289E−04 |

| Surface number | A14 | A16 | A18 | A20 |
|---|---|---|---|---|
| S1 | −3.7291E−04 | 7.3216E−05 | 0 | 0 |
| S2 | 4.9628E−05 | 3.2704E−05 | 0 | 0 |
| S3 | 1.4723E−05 | −6.5201E−06 | 0 | 0 |
| S4 | 1.4412E−05 | 8.4236E−06 | 0 | 0 |
| S5 | 3.1489E−06 | −2.8700E−06 | 2.3177E−06 | −5.1660E−07 |
| S6 | 7.1976E−06 | 1.7505E−05 | 4.2050E−06 | 9.6352E−06 |
| S7 | 9.5538E−05 | 1.2582E−05 | 7.2058E−06 | −3.5971E−07 |
| S8 | −3.4359E−04 | 1.4233E−04 | −4.0626E−05 | 1.1866E−05 |
| S9 | −1.0459E−03 | 3.4745E−04 | −9.5820E−05 | 1.6100E−05 |
| S10 | 1.2928E−03 | −1.8206E−05 | 2.2242E−04 | −7.5715E−05 |
| S11 | −2.7027E−03 | 7.9405E−04 | 3.5427E−05 | −3.5938E−05 |

It can also be seen from Table 1 that the image-side surface S12 of the sixth lens E6 is a non-rotationally symmetric aspheric surface (i.e., AAS surface), and the surface shape of the non-rotationally symmetric aspheric surface may be defined by using, but not limited to, the following non-rotationally symmetric aspheric surface formula:

FP, GP, HP, JP are the $4^{th}$, $6^{th}$, $8^{th}$, $10^{th}$, $12^{th}$, $14^{th}$, $16^{th}$, 18th and 20th order coefficients of the aspheric non-rotationally symmetric components, respectively. Table 3 below shows the AR, BR, CR, DR, ER, FR. GR, HR, JR coefficients and the AP, BP, CP, DP, EP, FP, GP, HP, JP coefficients that can be used in the non-rotationally symmetric aspheric surface S12 in Example 1.

TABLE 3

| AAS | AR | AP | BR | BP | CR |
|---|---|---|---|---|---|
| S12 | −2.9973E−01 | 7.8449E−04 | 2.5725E−01 | 2.1962E−04 | −1.9359E−01 |
| | AAS | CP | DR | DP | ER |
| | S12 | 4.7099E−05 | 1.0637E−01 | 6.4734E−06 | −3.9962E−02 |
| AAS | EP | FR | FP | GR | GP |
| S12 | 0.0000E+00 | 9.8295E−03 | 0.0000E+00 | −1.4964E−03 | 0.0000E+00 |
| | AAS | HR | HP | JR | JP |
| | S12 | 1.2635E−04 | 0.0000E+00 | −4.4520E−06 | 0.0000E+00 |

Table 4 shows effective focal lengths fy1 to fy6 in the Y-axis direction of each lens in Example 1, the effective focal length fx5 in the X-axis direction of the fifth lens E5, the effective focal length fx6 in the X-axis direction of the sixth lens E6, the effective focal length fx in the X-axis direction of the camera lens assembly, the effective focal length fy in the Y-axis direction of the camera lens assembly, a total optical length TTL of the camera lens assembly (i.e., a distance from the object-side surface S1 of the first lens E1 to the imaging plane S15 on the optical axis), the image heights IHx and IHy in the X-axis and Y-axis directions of the camera lens assembly, and the full field-of-views FOVx and FOVy in the X-axis and Y-axis directions of the camera lens assembly.

TABLE 4

| fy1 (mm) | −2.50 | fx (mm) | 1.74 |
|---|---|---|---|
| fy2 (mm) | 6.47 | fy (mm) | 1.74 |
| fy3 (mm) | 1.87 | TTL (mm) | 5.11 |
| fy4 (mm) | −2.44 | IHx (mm) | 1.75 |
| fy5 (mm) | 1.77 | IHy (mm) | 2.44 |
| fy6 (mm) | −8.45 | FOVx (°) | 91.7 |
| fx5 (mm) | 1.77 | FOVy (°) | 109.4 |
| fx6 (mm) | −8.42 | | |

Figure 2:
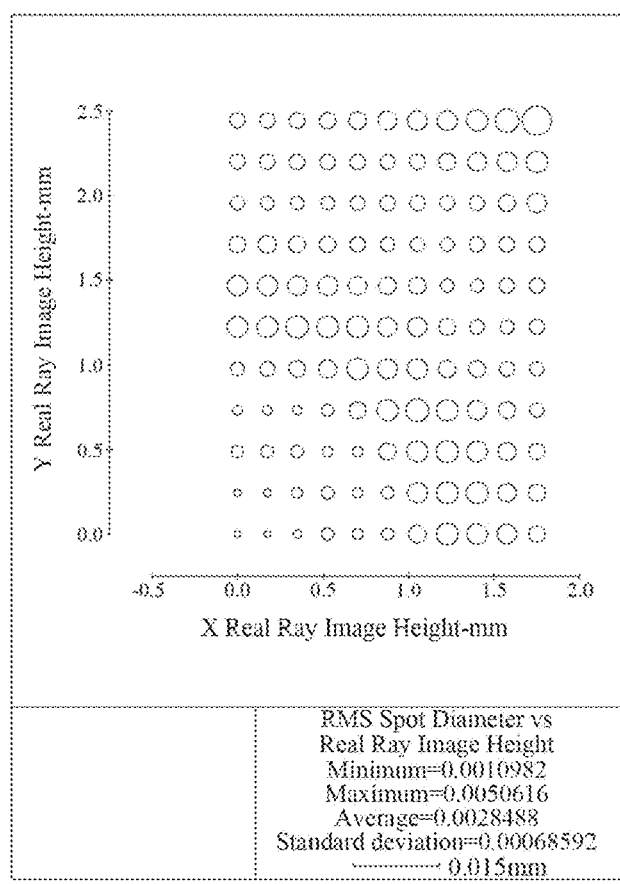
FIG. 2 schematically illustrates a situation where an RMS spot diameter of the camera lens assembly according to Example 1 is in a first quadrant.
Figure 3:
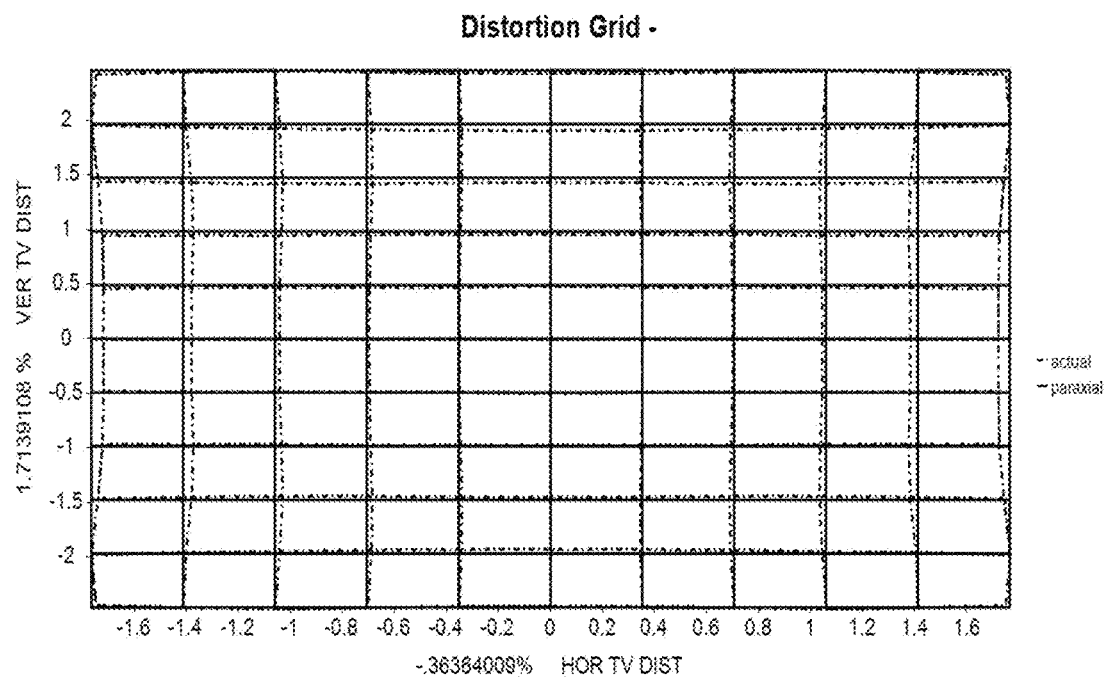
FIG. 3 illustrates a TV distortion diagram of the camera lens assembly according to Example 1 of the present disclosure.

FIG. 2 illustrates a size of an RMS spot diameter of the camera lens assembly according to Example 1 at different image height positions in a first quadrant. FIG. 3 illustrates a TV distortion diagram of the camera lens assembly according to Example 1, representing a difference in distortion between real rays and paraxial rays in a vertical area and a horizontal area. According to FIG. 2 to FIG. 3, it can be seen that the camera lens assembly according to Example 1 can achieve good image quality.

Example 2

Figure 4:
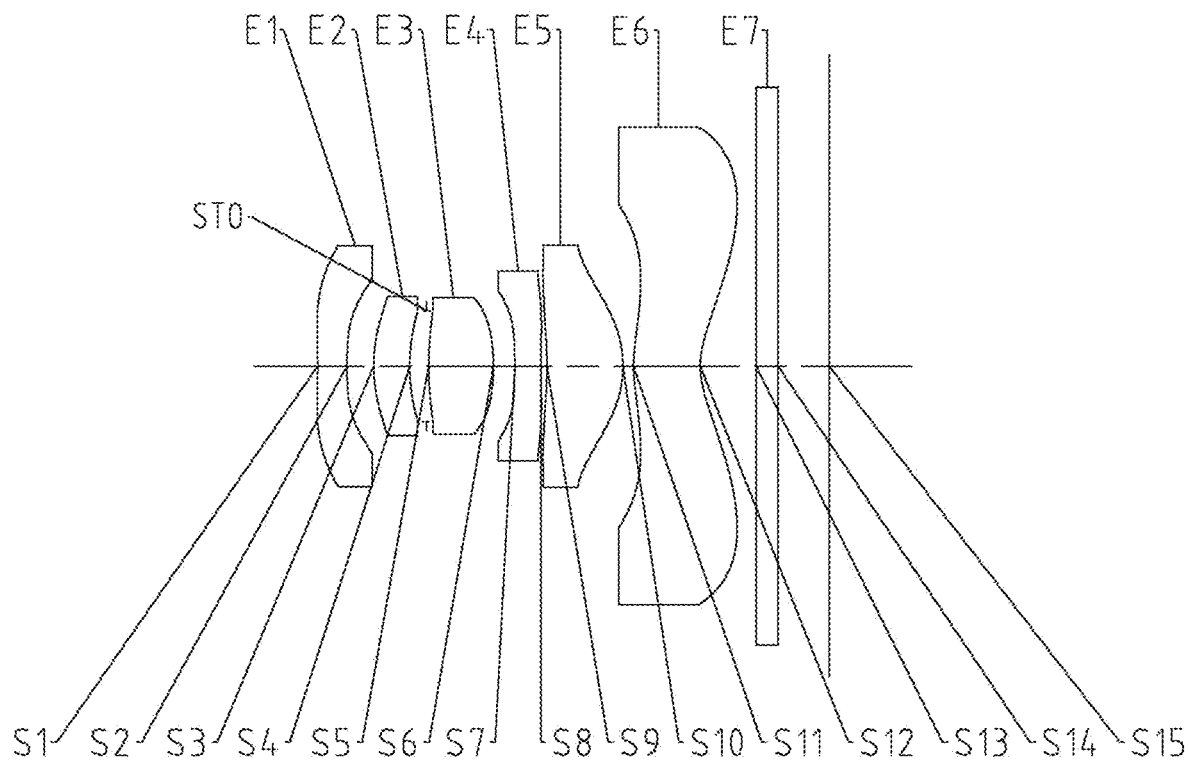
FIG. 4 illustrates a schematic structural diagram of a camera lens assembly according to Example 2 of the present disclosure.

A camera lens assembly according to Example 2 of the present disclosure is described below with reference to FIG. 4 to FIG. 6. In the present Example and the following Examples, for the purpose of brevity, the description of parts similar to those in Example 1 will be omitted. FIG. 4 illustrates a schematic structural diagram of the camera lens assembly according to Example 2 of the present disclosure.

As shown in FIG. 4, the camera lens assembly according to an exemplary embodiment of the present disclosure includes, sequentially along an optical axis from an object side to an image side: a first lens E1, a second lens E2, a stop STO, a third lens E3, a fourth lens E4, a fifth lens E5, a sixth lens E6, an optical filter E7, and an imaging plane S15.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 5 shows the surface type, the radius of curvature X, the radius of curvature Y, the thickness, the material, the conic coefficient X and the conic coefficient Y of each lens of the camera lens assembly in Example 2. The radius of curvature X, the radius of curvature Y and the thickness are shown in millimeters (mm).

TABLE 5

| Surface number | Surface type | Radius of curvature Y | Radius of curvature X | Thickness | Material | | Conic coefficient Y | Conic coefficient X |
|---|---|---|---|---|---|---|---|---|
| | | | | | Refractive index | Abbe number | | |
| OBJ | spherical | infinite | | infinite | | | | |
| S1 | aspheric | −3.7523 | | 0.2800 | 1.536 | 55.74 | −118.9565 | |
| S2 | aspheric | 5.7185 | | 0.2572 | | | −159.9603 | |
| S3 | aspheric | 1.5612 | | 0.3463 | 1.645 | 23.49 | −3.5871 | |
| S4 | aspheric | 1.9102 | | 0.1603 | | | −8.8322 | |
| STO | spherical | infinite | | 0.0205 | | | | |

TABLE 5-continued

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| S5 | aspheric | 2.9920 | | 0.6226 | 1.546 | 56.11 | −22.3787 | |
| S6 | aspheric | −2.0334 | | 0.2058 | | | −13.8468 | |
| S7 | aspheric | −9.1804 | | 0.2500 | 1.666 | 20.40 | 33.8997 | |
| S8 | aspheric | 6.8968 | | 0.0581 | | | −133.2323 | |
| S9 | aspheric | −4.0466 | | 0.7296 | 1.546 | 56.11 | 4.6607 | |
| S10 | aspheric | −1.2704 | | 0.1013 | | | −0.2859 | |
| S11(AAS) | aspheric | 1.2708 | 1.2706 | 0.6421 | 1.536 | 55.74 | −20.1635 | −20.8893 |
| S12(AAS) | aspheric | 0.8242 | 0.8269 | 0.5361 | | | −4.2608 | −4.4518 |
| S13 | aspheric | infinite | | 0.2100 | 1.517 | 64.2 | | |
| S14 | aspheric | infinite | | 0.4901 | | | | |
| S15 | spherical | infinite | | | | | | |

As can be seen from Table 5, in Example 2, the object-side surface and the image-side surface of any one of the first lens E1, the second lens E2, the third lens E3, the fourth lens E4 and the fifth lens E5 are aspheric surfaces; and the object-side surface S11 and the image-side surface S12 of the sixth lens E6 are non-rotationally symmetric aspheric surfaces.

Table 6 shows high-order coefficients applicable to each aspheric surface in Example 2, where each aspheric surface type may be defined by the formula (1) given in the above Example 1. Table 7 shows the rotationally symmetric components of the non-rotationally symmetric aspheric surfaces S11 and S12 and the higher-order coefficients of the non-rotationally symmetric components applicable to Example 2, where the non-rotationally symmetric aspheric surface type may be defined by the formula (2) given in the above Example 1.

TABLE 6

| Surface number | A4 | A6 | A8 | A10 | A12 |
|---|---|---|---|---|---|
| S1 | 3.9329E−01 | −4.5775E−01 | 4.3955E−01 | −3.0845E−01 | 1.4959E−01 |
| S2 | 9.5166E−01 | −1.5194E+00 | 2.3626E+00 | −3.5960E+00 | 3.9957E+00 |
| S3 | 2.4032E−01 | −9.9176E−01 | 2.8803E+00 | −8.6319E+00 | 1.5669E+01 |
| S4 | 2.1587E−01 | −5.2152E−01 | 3.2606E+00 | −2.4924E+01 | 1.1209E+02 |
| S5 | 1.4415E−01 | −1.8166E+00 | 2.3354E+01 | −2.2250E+02 | 1.3329E+03 |
| S6 | −5.3454E−01 | −3.2002E−01 | 5.5726E+00 | −3.9891E+01 | 1.6071E+02 |
| S7 | −6.7701E−01 | 1.6556E+00 | −1.3999E+01 | 7.2848E+01 | −2.2761E+02 |
| S8 | −2.7382E−01 | 3.6958E−01 | −1.0115E+00 | 4.4101E+00 | −1.2404E+01 |
| S9 | 1.5632E−01 | −4.5216E−01 | 3.0244E+00 | −9.3515E+00 | 1.5132E+01 |
| S10 | −7.8445E−01 | 3.5894E+00 | −8.7897E+00 | 1.4540E+01 | −1.5802E+01 |

| Surface number | A14 | A16 | A18 | A20 |
|---|---|---|---|---|
| S1 | −4.3661E−02 | 5.5538E−03 | 0 | 0 |
| S2 | −2.7632E+00 | 8.8592E−01 | 0 | 0 |
| S3 | −1.4012E+01 | 5.0792E+00 | 0 | 0 |
| S4 | −2.3642E+02 | 2.0538E+02 | 0 | 0 |
| S5 | −5.0166E+03 | 1.1437E+04 | −1.4393E+04 | 7.6911E+03 |
| S6 | −4.0520E+02 | 6.3369E+02 | −5.6771E+02 | 2.2420E+02 |
| S7 | 4.4672E+02 | −5.3851E+02 | 3.6615E+02 | −1.0828E+02 |
| S8 | 2.0006E+01 | −1.7888E+01 | 8.2660E+00 | −1.5493E+00 |
| S9 | −1.3972E+01 | 7.4505E+00 | −2.1468E+00 | 2.6187E−01 |
| S10 | 1.1011E+01 | −4.6843E+00 | 1.0922E+00 | −1.0437E−01 |

TABLE 7

| AAS | AR | AP | BR | BP | CR |
|---|---|---|---|---|---|
| S11 | −3.7571E−01 | 8.6863E−03 | 8.3675E−01 | 4.2528E−03 | −1.2788E+00 |
| S12 | −1.9604E−01 | 2.3319E−02 | 2.3409E−01 | 1.6014E−02 | −1.9669E−01 |

| AAS | CP | DR | DP | ER |
|---|---|---|---|---|
| S11 | 1.2756E−03 | 1.2783E+00 | −8.4634E−05 | −8.7167E−01 |
| S12 | 8.8118E−03 | 1.0887E−01 | 4.0787E−03 | −4.0094E−02 |

| AAS | EP | FR | FP | GR | GP |
|---|---|---|---|---|---|
| S11 | −1.9256E−04 | 4.0671E−01 | 6.4195E−04 | −1.2565E−01 | 1.6441E−03 |
| S12 | 1.0510E−03 | 9.7189E−03 | −5.6484E−04 | −1.4905E−03 | −9.6241E−04 |

TABLE 7-continued

| AAS | HR | HP | JR | JP |
|---|---|---|---|---|
| S11 | 2.3435E−02 | 1.6661E−03 | −2.0092E−03 | 0.0000E+00 |
| S12 | 1.3132E−04 | −6.0535E−04 | −5.0771E−06 | 0.0000E+00 |

Table 8 shows effective focal lengths fy1 to fy6 in the Y-axis direction of each lens in Example 2, the effective focal length fx5 in the X-axis direction of the fifth lens E5, the effective focal length fx6 in the X-axis direction of the sixth lens E6, the effective focal length fx in the X-axis direction of the camera lens assembly, the effective focal length fy in the Y-axis direction of the camera lens assembly, a total optical length TTL of the camera lens assembly, the image heights IHx and IHy in the X-axis and Y-axis directions of the camera lens assembly, and the full field-of-views FOVx and FOVy in the X-axis and Y-axis directions of the camera lens assembly.

TABLE 8

| fy1 (mm) | −4.18 | fx (mm) | 2.18 |
|---|---|---|---|
| fy2 (mm) | 9.54 | fy (mm) | 2.19 |
| fy3 (mm) | 2.32 | TTL (mm) | 4.91 |
| fy4 (mm) | −5.87 | IHx (mm) | 1.73 |
| fy5 (mm) | 3.10 | IHy (mm) | 2.48 |
| fy6 (mm) | −8.78 | FOVx (°) | 76.5 |
| fx5 (mm) | 3.10 | FOVy (°) | 97.0 |
| fx6 (mm) | −8.92 | | |

Figure 5:
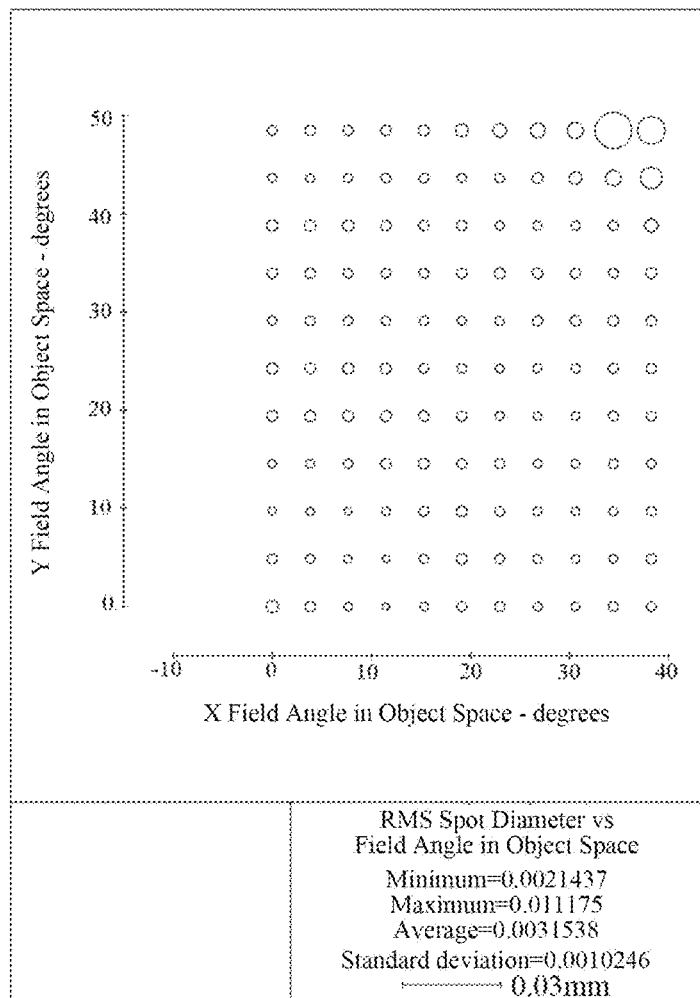
FIG. 5 schematically illustrates a situation where an RMS spot diameter of the camera lens assembly according to Example 2 is in a first quadrant.
Figure 6:
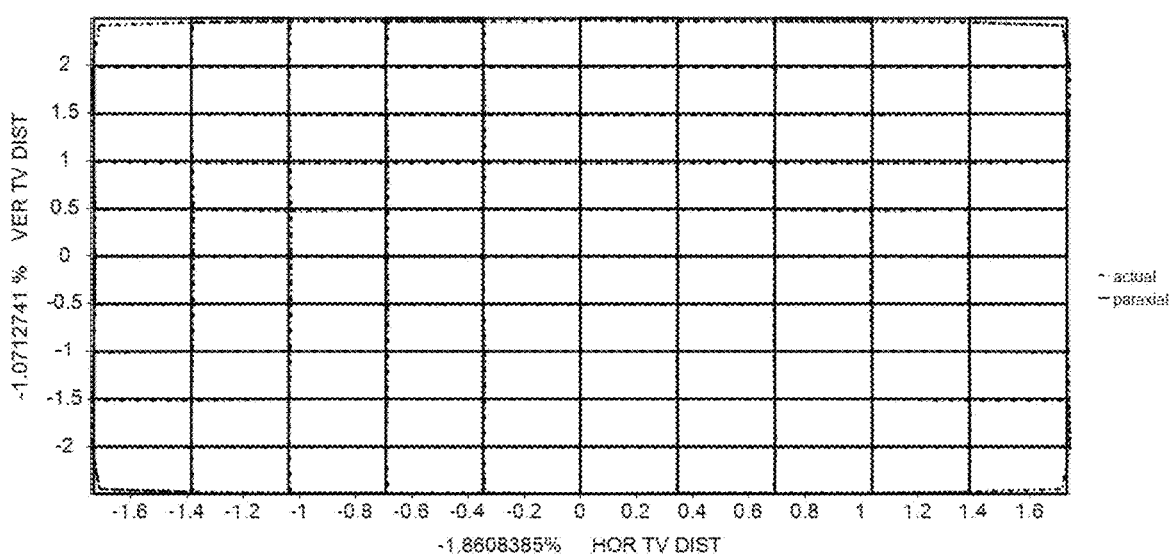
FIG. 6 illustrates a TV distortion diagram of the camera lens assembly according to Example 2 of the present disclosure.

FIG. 5 illustrates a size of an RMS spot diameter of the camera lens assembly according to Example 2 at different field-of-views in a first quadrant. FIG. 6 illustrates a TV distortion diagram of the camera lens assembly according to Example 2, representing a difference in distortion between real rays and paraxial rays in a vertical area and a horizontal area. According to FIG. 5 to FIG. 6, it can be seen that the camera lens assembly according to Example 2 can achieve good image quality.

Example 3

Figure 7:
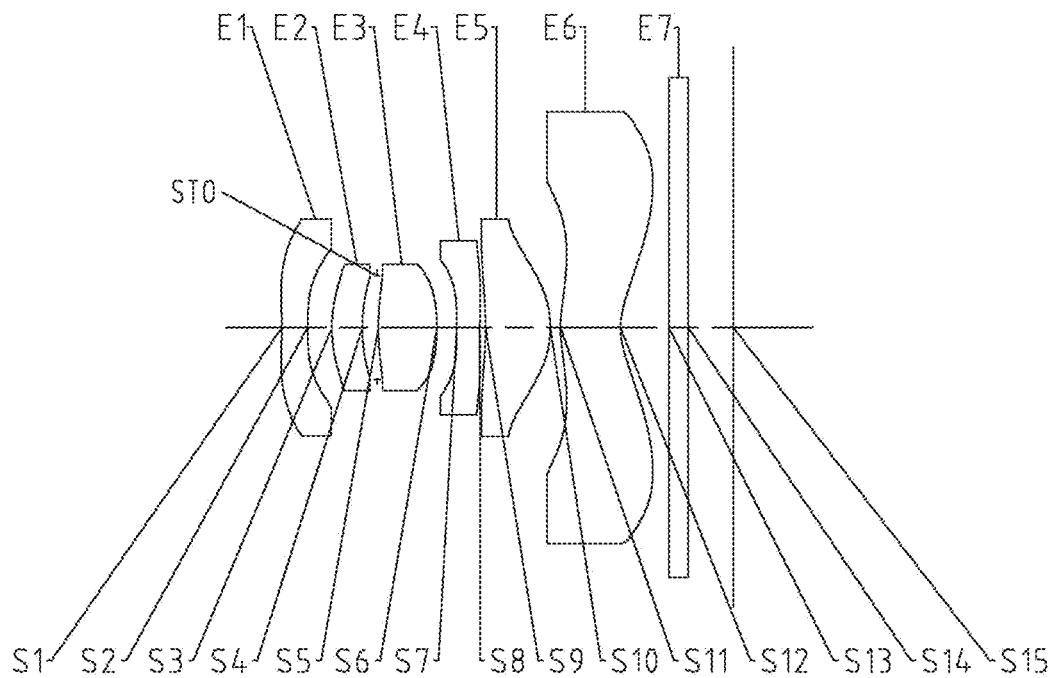
FIG. 7 illustrates a schematic structural diagram of a camera lens assembly according to Example 3 of the present disclosure.

A camera lens assembly according to Example 3 of the present disclosure is described below with reference to FIG. 7 to FIG. 9. FIG. 7 illustrates a schematic structural diagram of the camera lens assembly according to Example 3 of the present disclosure.

As shown in FIG. 7, the camera lens assembly according to an exemplary embodiment of the present disclosure includes, sequentially along an optical axis from an object side to an image side: a first lens E1, a second lens E2, a stop STO, a third lens E3, a fourth lens E4, a fifth lens E5, a sixth lens E6, an optical filter E7, and an imaging plane S15.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 9 shows the surface type, the radius of curvature X, the radius of curvature Y, the thickness, the material, the conic coefficient X and the conic coefficient Y of each lens of the camera lens assembly in Example 3. The radius of curvature X, the radius of curvature Y and the thickness are shown in millimeters (mm).

TABLE 9

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | spherical | infinite | | infinite | | | | |
| S1 | aspheric | −3.8341 | | 0.2800 | 1.536 | 55.74 | −122.4919 | |
| S2 | aspheric | 5.9182 | | 0.2643 | | | −194.1226 | |
| S3 | aspheric | 1.5793 | | 0.3310 | 1.645 | 23.49 | −3.7696 | |
| S4 | aspheric | 1.8876 | | 0.1632 | | | −8.5994 | |
| STO | spherical | infinite | | 0.0114 | | | 0.0000 | |
| S5 | aspheric | 3.0039 | | 0.6377 | 1.546 | 56.11 | −21.0097 | |
| S6 | aspheric | −1.9870 | | 0.2153 | | | −14.5050 | |
| S7 | aspheric | −9.3124 | | 0.2500 | 1.666 | 20.40 | 53.1144 | |
| S8 | aspheric | 6.3568 | | 0.0620 | | | −176.2671 | |
| S9 | aspheric | −3.8318 | | 0.7040 | 1.546 | 56.11 | 5.2504 | |
| S10 | aspheric | −1.2563 | | 0.1099 | | | −0.2586 | |
| S11(AAS) | aspheric | 1.2539 | 1.2527 | 0.6541 | 1.536 | 55.74 | −19.7332 | −20.4719 |
| S12(AAS) | aspheric | 0.8084 | 0.8102 | 0.5268 | | | −4.2797 | −4.3936 |
| S13 | aspheric | infinite | | 0.2100 | 1.517 | 64.2 | | |
| S14 | aspheric | infinite | | 0.4901 | | | | |
| S15 | spherical | infinite | | | | | | |

As can be seen from Table 9, in Example 3, the object-side surface and the image-side surface of any one of the first lens E1, the second lens E2, the third lens E3, the fourth lens E4 and the fifth lens E5 are aspheric surfaces; and the object-side surface S11 and the image-side surface S12 of the sixth lens E6 are non-rotationally symmetric aspheric surfaces.

Table 10 shows high-order coefficients applicable to each aspheric surface in Example 3, where each aspheric surface type may be defined by the formula (1) given in the above Example 1. Table 11 shows the rotationally symmetric components of the non-rotationally symmetric aspheric surfaces S11 and S12 and the higher-order coefficients of the non-rotationally symmetric components applicable to Example 3, where the non-rotationally symmetric aspheric surface type may be defined by the formula (2) given in the above Example 1.

TABLE 10

| Surface number | A4 | A6 | A8 | A10 | A12 |
|---|---|---|---|---|---|
| S1 | 3.9549E−01 | −4.5712E−01 | 4.3952E−01 | −3.0861E−01 | 1.4951E−01 |
| S2 | 9.5066E−01 | −1.5148E+00 | 2.3632E+00 | −3.5943E+00 | 4.0005E+00 |
| S3 | 2.3550E−01 | −1.0004E+00 | 2.8781E+00 | −8.6213E+00 | 1.5700E+01 |
| S4 | 2.1636E−01 | −5.3153E−01 | 3.2455E+00 | −2.4833E+01 | 1.1233E+02 |
| S5 | 1.4835E−01 | −1.8156E+00 | 2.3351E+01 | −2.2255E+02 | 1.3327E+03 |
| S6 | −5.3217E−01 | −3.2292E−01 | 5.5595E+00 | −3.9920E+01 | 1.6069E+02 |
| S7 | −6.8081E−01 | 1.6582E+00 | −1.4007E+01 | 7.2813E+01 | −2.2768E+00 |
| S8 | −2.7301E−01 | 3.7033E−01 | −1.0132E+01 | 4.4067E+01 | −1.2407E+01 |
| S9 | 1.5671E−01 | −4.5259E−01 | 3.0253E+00 | −9.3508E+00 | 1.5132E+01 |
| S10 | −7.8828E−01 | 3.5872E+00 | −8.7889E+00 | 1.4540E+01 | −1.5802E+01 |

| Surface number | A14 | A16 | A18 | A20 |
|---|---|---|---|---|
| S1 | −4.3503E−02 | 5.7494E−03 | 0 | 0 |
| S2 | −2.7542E+00 | 8.8786E−01 | 0 | 0 |
| S3 | −1.3994E+01 | 4.9288E+00 | 0 | 0 |
| S4 | −2.3752E+02 | 1.9836E+00 | 0 | 0 |
| S5 | −5.0174E+03 | 1.1435E+04 | −1.4394E+04 | 7.7059E+03 |
| S6 | −4.0518E+02 | 6.3377E+02 | −5.6787E+02 | 2.2257E+02 |
| S7 | 4.4664E+02 | −5.3859E+02 | 3.6617E+02 | −1.0804E+02 |
| S8 | 2.0002E+01 | −1.7890E+01 | 8.2666E+00 | −1.5463E+00 |
| S9 | −1.3972E+01 | 7.4501E+00 | −2.1469E+00 | 2.6186E−01 |
| S10 | 1.1011E+01 | −4.6840E+00 | 1.0923E+00 | −1.0435E−01 |

TABLE 11

| AAS | AR | AP | BR | BP | CR |
|---|---|---|---|---|---|
| S11 | −3.8752E−01 | 1.0224E−02 | 8.4023E−01 | 5.2062E−03 | −1.2772E+00 |
| S12 | −1.9949E−01 | 2.1607E−02 | 2.3536E−01 | 1.5271E−02 | −1.9665E−01 |

| AAS | CP | DR | DP | ER |
|---|---|---|---|---|
| S11 | 1.6588E−03 | 1.2785E+00 | −6.7452E−06 | −8.7171E−01 |
| S12 | 8.9244E−03 | 1.0886E−01 | 4.1601E−03 | −4.0098E−02 |

| AAS | EP | FR | FP | GR | GP |
|---|---|---|---|---|---|
| S11 | −2.0844E−04 | 4.0659E−01 | 6.0493E−04 | −1.2569E−01 | 1.5956E−03 |
| S12 | 1.0472E−03 | 9.7179E−03 | −5.7725E−04 | −1.4906E−03 | −9.5681E−04 |

| AAS | HR | HP | JR | JP |
|---|---|---|---|---|
| S11 | 2.3434E−02 | 1.6554E−03 | −1.9997E−03 | 0.0000E+00 |
| S12 | 1.3132E−04 | −5.6960E−04 | −5.0668E−06 | 0.0000E+00 |

Table 12 shows effective focal lengths fy1 to fy6 in the Y-axis direction of each lens in Example 3, the effective focal length fx5 in the X-axis direction of the fifth lens E5, the effective focal length fx6 in the X-axis direction of the sixth lens E6, the effective focal length fx in the X-axis direction of the camera lens assembly, the effective focal length fy in the Y-axis direction of the camera lens assembly, a total optical length TTL of the camera lens assembly, the image heights IHx and IHy in the X-axis and Y-axis directions of the camera lens assembly, and the full field-of-views FOVx and FOVy in the X-axis and Y-axis directions of the camera lens assembly.

TABLE 12

| fy1 (mm) | −4.29 | fx (mm) | 2.19 |
|---|---|---|---|
| fy2 (mm) | 10.56 | fy (mm) | 2.20 |
| fy3 (mm) | 2.29 | TTL (mm) | 4.91 |
| fy4 (mm) | −5.63 | IHx (mm) | 1.81 |
| fy5 (mm) | 3.12 | IHy (mm) | 2.42 |
| fy6 (mm) | −8.70 | FOVx (°) | 78.8 |

TABLE 12-continued

| fx5 (mm) | 3.12 | FOVy (°) | 95.6 |
|---|---|---|---|
| fx6 (mm) | −8.84 | | |

Figure 8:
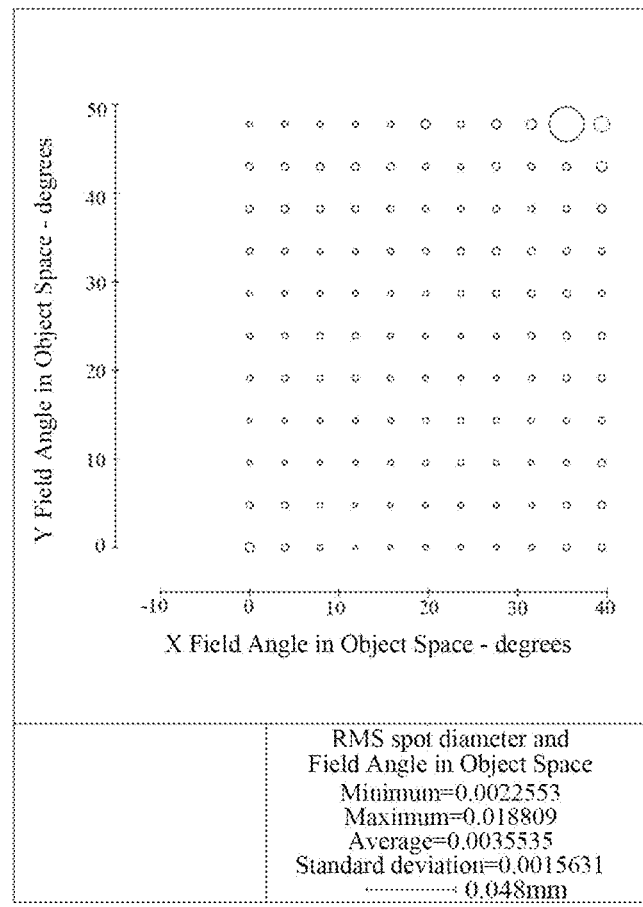
FIG. 8 schematically illustrates a situation where an RMS spot diameter of the camera lens assembly according to Example 3 is in a first quadrant.
Figure 9:
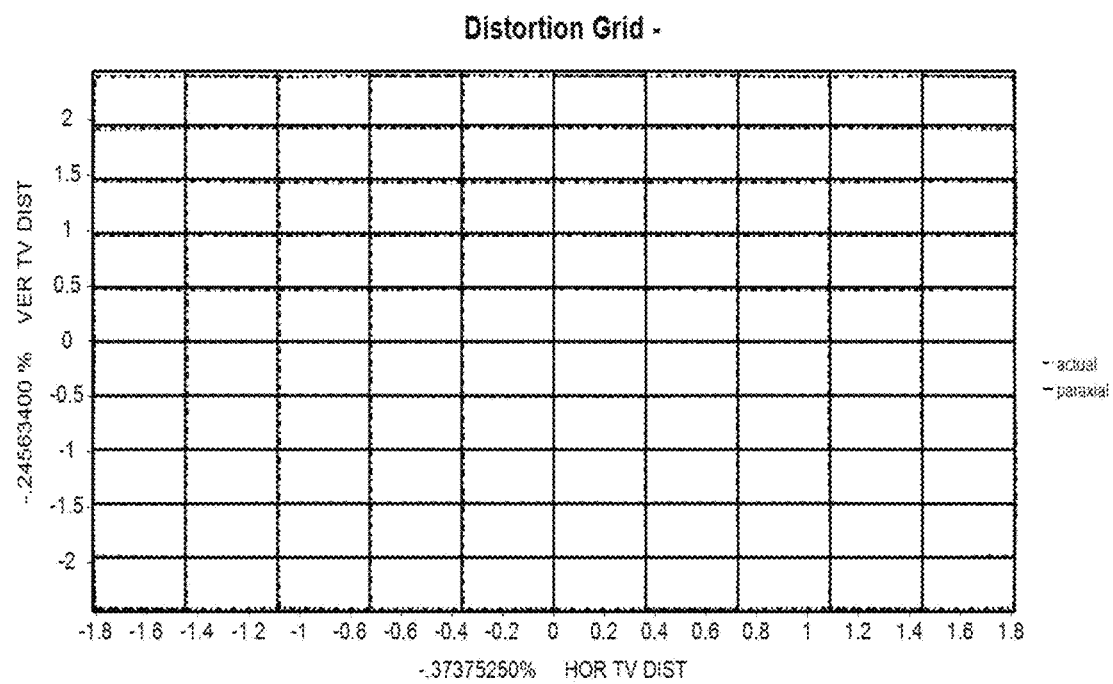
FIG. 9 illustrates a TV distortion diagram of the camera lens assembly according to Example 3 of the present disclosure.

FIG. 8 illustrates a size of an RMS spot diameter of the camera lens assembly according to Example 3 at different field-of-views in a first quadrant. FIG. 9 illustrates a TV distortion diagram of the camera lens assembly according to Example 3, representing a difference in distortion between real rays and paraxial rays in a vertical area and a horizontal area. According to FIG. 8 to FIG. 9, it can be seen that the camera lens assembly according to Example 3 can achieve good image quality.

Example 4

Figure 10:
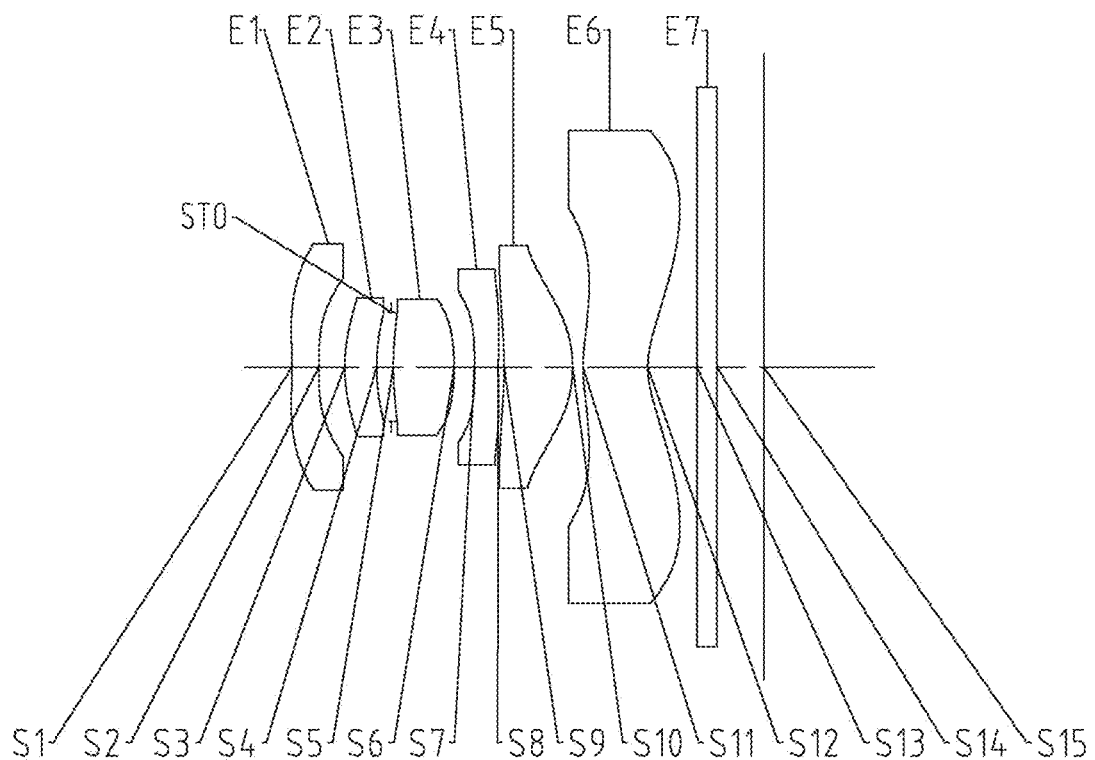
FIG. 10 illustrates a schematic structural diagram of a camera lens assembly according to Example 4 of the present disclosure.

A camera lens assembly according to Example 4 of the present disclosure is described below with reference to FIG. 10 to FIG. 12. FIG. 10 illustrates a schematic structural diagram of the camera lens assembly according to Example 4 of the present disclosure.

As shown in FIG. 10, the camera lens assembly according to an exemplary embodiment of the present disclosure includes, sequentially along an optical axis from an object side to an image side: a first lens E1, a second lens E2, a stop STO, a third lens E3, a fourth lens E4, a fifth lens E5, a sixth lens E6, an optical filter E7, and an imaging plane S15.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 13 shows the surface type, the radius of curvature X, the radius of curvature Y, the thickness, the material, the conic coefficient X and the conic coefficient Y of each lens of the camera lens assembly in Example 4. The radius of curvature X, the radius of curvature Y and the thickness are shown in millimeters (mm).

TABLE 13

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | spherical | infinite | | infinite | | | | |
| S1 | aspheric | −3.9606 | | 0.2800 | 1.536 | 55.74 | −129.1173 | |
| S2 | aspheric | 5.8269 | | 0.2728 | | | −207.2412 | |
| S3 | aspheric | 1.5833 | | 0.3343 | 1.645 | 23.49 | −3.7703 | |
| S4 | aspheric | 1.8883 | | 0.1560 | | | −8.5854 | |
| STO | spherical | infinite | | 0.0194 | | | | |
| S5 | aspheric | 3.0432 | | 0.6372 | 1.546 | 56.11 | −22.2151 | |
| S6 | aspheric | −2.0189 | | 0.2128 | | | −15.3149 | |
| S7 | aspheric | −9.1263 | | 0.2500 | 1.666 | 20.40 | 50.4970 | |
| S8 | aspheric | 6.4549 | | 0.0613 | | | −196.1356 | |
| S9 | aspheric | −3.8019 | | 0.7182 | 1.546 | 56.11 | 5.6690 | |
| S10 | aspheric | −1.2536 | | 0.1080 | | | −0.2413 | |
| S11(AAS) | aspheric | 1.2842 | 1.2773 | 0.6799 | 1.536 | 55.74 | −20.6124 | −20.9508 |
| S12(AAS) | aspheric | 0.8286 | 0.8234 | 0.5165 | | | −4.3710 | −4.4121 |
| S13 | aspheric | infinite | | 0.2100 | 1.517 | 64.2 | | |
| S14 | aspheric | infinite | | 0.4901 | | | | |
| S15 | spherical | infinite | | | | | | |

As can be seen from Table 13, in Example 4, the object-side surface and the image-side surface of any one of the first lens E1, the second lens E2, the third lens E3, the fourth lens E4 and the fifth lens E5 are aspheric surfaces; and the object-side surface S11 and the image-side surface S12 of the sixth lens E6 are non-rotationally symmetric aspheric surfaces.

Table 14 shows high-order coefficients applicable to each aspheric surface in Example 4, where each aspheric surface type may be defined by the formula (1) given in the above Example 1. Table 15 shows the rotationally symmetric components of the non-rotationally symmetric aspheric surfaces S11 and S12 and the higher-order coefficients of the non-rotationally symmetric components applicable to Example 4, where the non-rotationally symmetric aspheric surface type may be defined by the formula (2) given in the above Example 1.

TABLE 14

| Surface number | A4 | A6 | A8 | A10 | A12 |
|---|---|---|---|---|---|
| S1 | 3.9630E−01 | −4.5717E−01 | 4.3939E−01 | −3.0876E−01 | 1.4944E−01 |
| S2 | 9.4685E−01 | −1.5154E+00 | 2.3615E+00 | −3.5972E+00 | 4.0016E+00 |
| S3 | 2.3534E−01 | −9.9961E−01 | 2.8745E+00 | −8.6251E+00 | 1.5701E+01 |

TABLE 14-continued

| | | | | | |
|---|---|---|---|---|---|
| S4 | 2.1676E−01 | −5.3631E−01 | 3.2335E+00 | −2.4860E+01 | 1.1214E+02 |
| S5 | 1.4768E−01 | −1.8135E+00 | 2.3342E+01 | −2.2252E+02 | 1.3329E+03 |
| S6 | −5.2971E−01 | −3.1378E−01 | 5.5590E+00 | −3.9935E+01 | 1.6068E+02 |
| S7 | −6.8244E−01 | 1.6652E+00 | −1.4007E+00 | 7.2812E+01 | −2.2768E+02 |
| S8 | −2.7476E−01 | 3.7025E−01 | −1.0140E+00 | 4.4058E+00 | −1.2407E+01 |
| S9 | 1.5579E−01 | −4.5523E−01 | 3.0246E+00 | −9.3504E+00 | 1.5133E+01 |
| S10 | −7.9338E−01 | 3.5858E+00 | −8.7887E+00 | 1.4540E+01 | −1.5802E+01 |

| Surface number | A14 | A16 | A18 | A20 |
|---|---|---|---|---|
| S1 | −4.3467E−02 | 5.8275E−03 | 0 | 0 |
| S2 | −2.7496E+00 | 8.9034E−01 | 0 | 0 |
| S3 | −1.3973E+01 | 4.9228E+00 | 0 | 0 |
| S4 | −2.3762E+02 | 2.0032E+02 | 0 | 0 |
| S5 | −5.0171E+03 | 1.1435E+04 | −1.4396E+04 | 7.7041E+03 |
| S6 | −4.0515E+02 | 6.3396E+02 | −5.6764E+02 | 2.2226E+02 |
| S7 | 4.4664E+02 | −5.3857E+02 | 3.6619E+02 | −1.0791E+02 |
| S8 | 2.0003E+01 | −1.7889E+01 | 8.2679E+00 | −1.5439E+00 |
| S9 | −1.3971E+01 | 7.4505E+00 | −2.1467E+00 | 2.6169E−01 |
| S10 | 1.1011E+01 | −4.6840E+00 | 1.0923E+00 | −1.0439E−01 |

TABLE 15

| AAS | AR | AP | BR | BP | CR |
|---|---|---|---|---|---|
| S11 | −3.8716E−01 | 9.2575E−03 | 8.4117E−01 | 5.4370E−03 | −1.2780E+00 |
| S12 | −2.0078E−01 | 1.8918E−02 | 2.3575E−01 | 1.4585E−02 | −1.9680E−01 |

| AAS | CP | DR | DP | ER |
|---|---|---|---|---|
| S11 | 1.8465E−03 | 1.2782E+00 | 3.9427E−05 | −8.7169E−01 |
| S12 | 8.8292E−03 | 1.0886E−01 | 4.1797E−03 | −4.0100E−02 |

| AAS | EP | FR | FP | GR | GP |
|---|---|---|---|---|---|
| S11 | −2.1865E−04 | 4.0662E−01 | 5.8891E−04 | −1.2573E−01 | 1.5593E−03 |
| S12 | 1.0343E−03 | 9.7182E−03 | −5.9066E−04 | −1.4905E−03 | −9.5644E−04 |

| AAS | HR | HP | JR | JP |
|---|---|---|---|---|
| S11 | 2.3427E−02 | 1.6204E−03 | −1.9958E−03 | 0.0000E+00 |
| S12 | 1.3132E−04 | −5.5408E−04 | −5.0693E−06 | 0.0000E+00 |

Table 16 shows effective focal lengths fy1 to fy6 in the Y-axis direction of each lens in Example 4, the effective focal length fx5 in the X-axis direction of the fifth lens E5, the effective focal length fx6 in the X-axis direction of the sixth lens E6, the effective focal length fx in the X-axis direction of the camera lens assembly, the effective focal length fy in the Y-axis direction of the camera lens assembly, a total optical length TTL of the camera lens assembly, the image heights IHx and IHy in the X-axis and Y-axis directions of the camera lens assembly, and the full field-of-views FOVx and FOVy in the X-axis and Y-axis directions of the camera lens assembly.

TABLE 16

| fy1 (mm) | −4.35 | fx (mm) | 2.19 |
|---|---|---|---|
| fy2 (mm) | 10.64 | fy (mm) | 2.19 |
| fy3 (mm) | 2.33 | TTL (mm) | 4.95 |
| fy4 (mm) | −5.64 | IHx (mm) | 1.81 |
| fy5 (mm) | 3.12 | IHy (mm) | 2.41 |
| fy6 (mm) | −9.09 | FOVx (°) | 78.8 |
| fx5 (mm) | 3.12 | FOVy (°) | 95.6 |
| fx6 (mm) | −9.06 | | |

Figure 11:
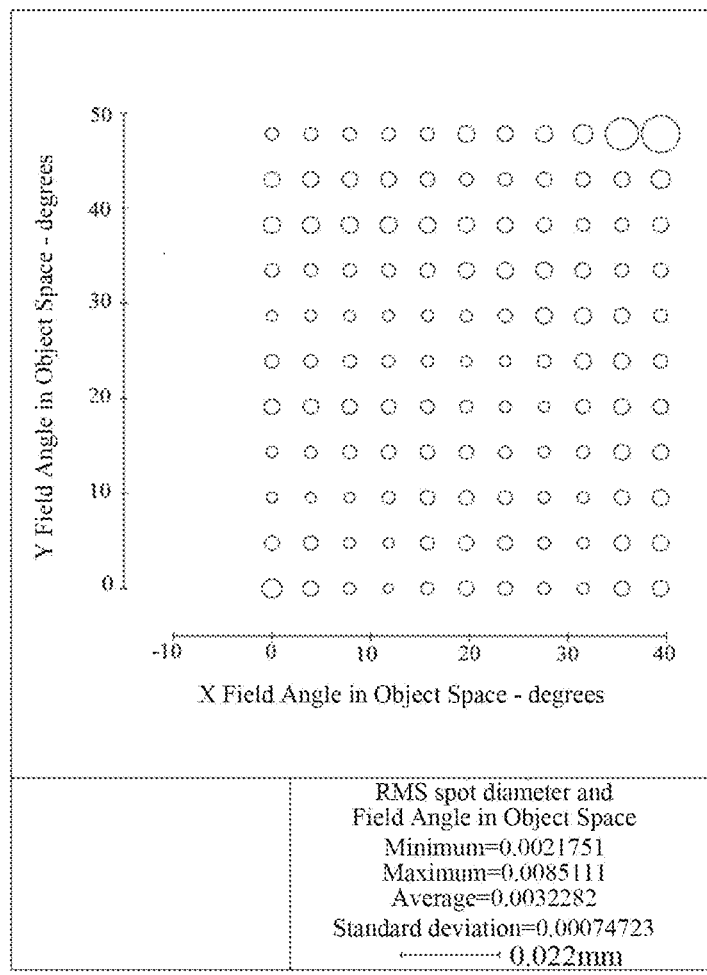
FIG. 11 schematically illustrates a situation where an RMS spot diameter of the camera lens assembly according to Example 4 is in a first quadrant.
Figure 12:
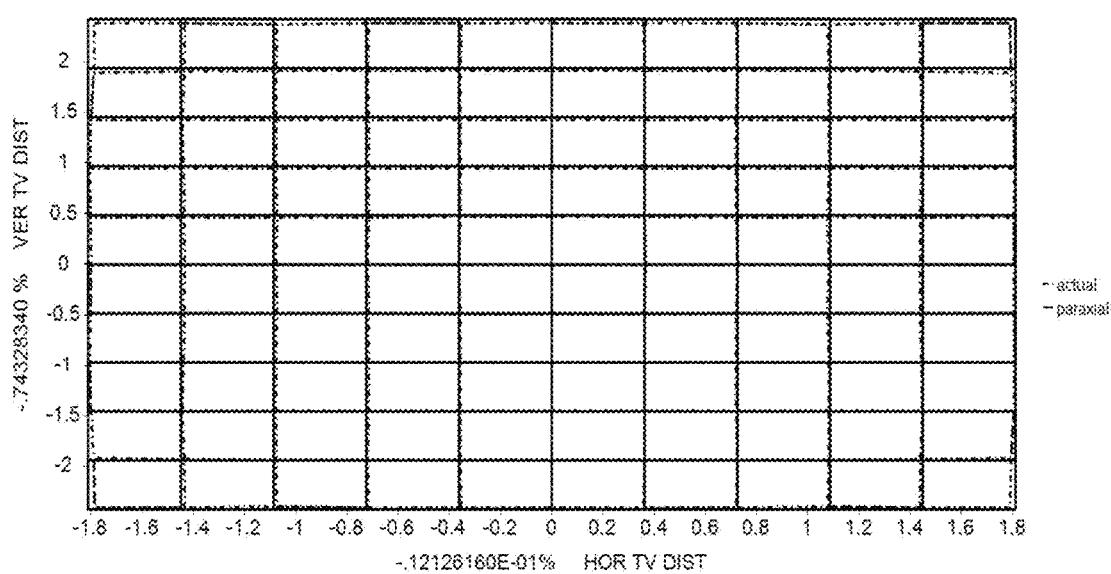
FIG. 12 illustrates a TV distortion diagram of the camera lens assembly according to Example 4 of the present disclosure.

FIG. 11 illustrates a size of an RMS spot diameter of the camera lens assembly according to Example 4 at different field-of-views in a first quadrant. FIG. 12 illustrates a TV distortion diagram of the camera lens assembly according to Example 4, representing a difference in distortion between real rays and paraxial rays in a vertical area and a horizontal area. According to FIG. 11 to FIG. 12, it can be seen that the camera lens assembly according to Example 4 can achieve good image quality.

Example 5

Figure 13:
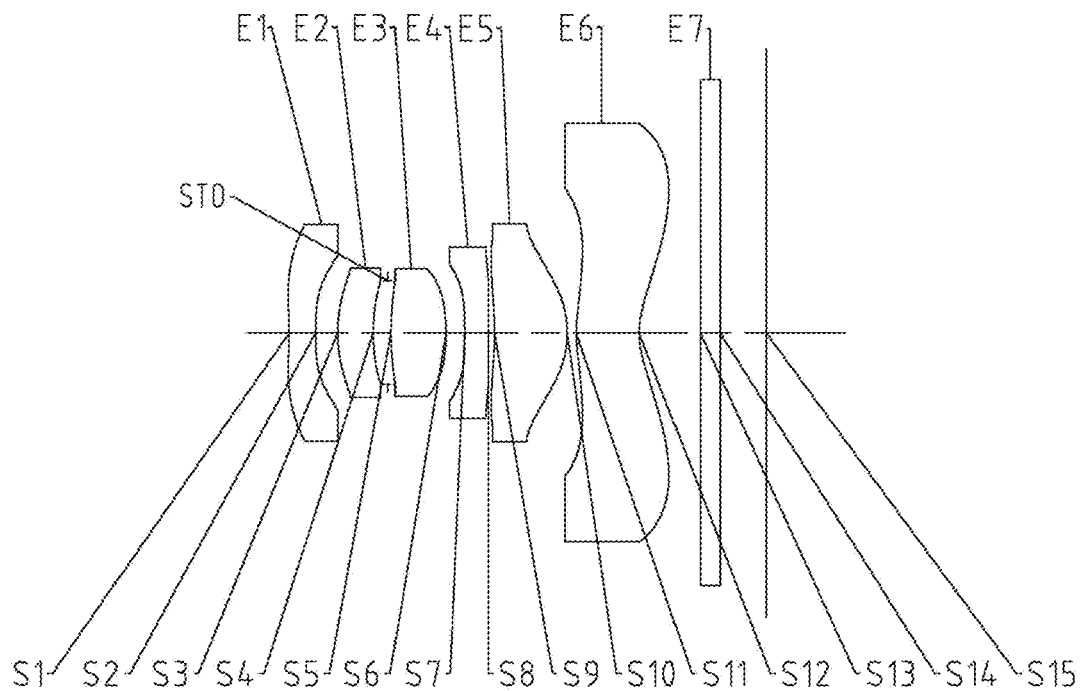
FIG. 13 illustrates a schematic structural diagram of a camera lens assembly according to Example 5 of the present disclosure.

A camera lens assembly according to Example 5 of the present disclosure is described below with reference to FIG. 13 to FIG. 15. FIG. 13 illustrates a schematic structural diagram of the camera lens assembly according to Example 5 of the present disclosure.

As shown in FIG. 13, the camera lens assembly according to an exemplary embodiment of the present disclosure includes, sequentially along an optical axis from an object side to an image side: a first lens E1, a second lens E2, a stop STO, a third lens E3, a fourth lens E4, a fifth lens E5, a sixth lens E6, an optical filter E7, and an imaging plane S15.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 17 shows the surface type, the radius of curvature X, the radius of curvature Y, the thickness, the material, the conic coefficient X and the conic coefficient Y of each lens of the camera lens assembly in Example 5. The radius of curvature X, the radius of curvature Y and the thickness are shown in millimeters (mm).

TABLE 17

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | spherical | infinite | | infinite | | | | |
| S1 | aspheric | −3.2700 | | 0.2800 | 1.536 | 55.74 | −105.9412 | |
| S2 | aspheric | 5.5178 | | 0.2346 | | | −56.6093 | |
| S3 | aspheric | 1.5813 | | 0.3775 | 1.645 | 23.49 | −3.0638 | |
| S4 | aspheric | 2.0011 | | 0.1538 | | | −9.2640 | |
| STO | aspheric | infinite | | 0.0349 | | | | |
| S5 | aspheric | 3.0875 | | 0.5779 | 1.546 | 56.11 | −25.0510 | |
| S6 | spherical | −2.0432 | | 0.1989 | | | −14.6657 | |
| S7 | aspheric | −7.7654 | | 0.2500 | 1.666 | 20.40 | −15.5860 | |
| S8 | aspheric | 7.9297 | | 0.0659 | | | −81.1520 | |
| S9(AAS) | aspheric | −3.6684 | −3.6590 | 0.7713 | 1.546 | 56.11 | 1.2709 | 2.3823 |
| S10(AAS) | aspheric | −1.2229 | −1.2009 | 0.0959 | | | −0.2940 | −0.3151 |
| S11(AAS) | aspheric | 1.3330 | 1.3697 | 0.6669 | 1.536 | 55.74 | −26.4312 | −28.6440 |
| S12(AAS) | aspheric | 0.8728 | 0.8787 | 0.6449 | | | −4.8625 | −5.1171 |
| S13 | aspheric | infinite | | 0.2100 | 1.517 | 64.2 | | |
| S14 | aspheric | infinite | | 0.4901 | | | | |
| S15 | spherical | infinite | | | | | | |

As can be seen from Table 17, in Example 5, the object-side surface and the image-side surface of any one of the first lens E1, the second lens E2, the third lens E3 and the fourth lens E4 are aspheric surfaces; and the object-side surface and the image-side surface of any one of the fifth lens E5 and the sixth lens E6 are non-rotationally symmetric aspheric surfaces.

Table 18 shows high-order coefficients applicable to each aspheric surface in Example 5, where each aspheric surface type may be defined by the formula (1) given in the above Example 1. Table 19 shows the rotationally symmetric components of the non-rotationally symmetric aspheric surfaces S9 to S12 and the higher-order coefficients of the non-rotationally symmetric components applicable to Example 5, where the non-rotationally symmetric aspheric surface type may be defined by the formula (2) given in the above Example 1.

TABLE 18

| Surface number | A4 | A6 | A8 | A10 | A12 |
|---|---|---|---|---|---|
| S1 | 3.8493E−01 | −4.5837E−01 | 4.3922E−01 | −3.0865E−01 | 1.4944E−01 |
| S2 | 9.6073E−01 | −1.5298E+00 | 2.3494E+00 | −3.6079E+00 | 3.9892E+00 |
| S3 | 2.5079E−01 | −9.8086E−01 | 2.8828E+00 | −8.6540E+00 | 1.5603E+01 |
| S4 | 2.1164E−01 | −5.1115E−01 | 3.2822E+00 | −2.4996E+01 | 1.1170E+02 |
| S5 | 1.3701E−01 | −1.8349E+00 | 2.3312E+01 | −2.2258E+02 | 1.3329E+03 |
| S6 | −5.3065E−01 | −3.2324E−01 | 5.5509E+00 | −3.9903E+01 | 1.6068E+02 |
| S7 | −6.6931E−01 | 1.6563E+00 | −1.3999E+01 | 7.2866E+01 | −2.2756E+02 |
| S8 | −2.7552E−01 | 3.6856E−01 | −1.0079E+00 | 4.4172E+00 | −1.2400E+01 |

| Surface number | A14 | A16 | A18 | A20 |
|---|---|---|---|---|
| S1 | −4.3732E−02 | 5.5327E−03 | 0 | 0 |
| S2 | −2.7608E+00 | 9.0076E−01 | 0 | 0 |
| S3 | −1.4073E+01 | 5.2402E+00 | 0 | 0 |

TABLE 18-continued

| | | | | |
|---|---|---|---|---|
| S4 | −2.3674E+02 | 2.0801E+02 | 0 | 0 |
| S5 | −5.0167E+03 | 1.1437E+04 | −1.4391E+04 | 7.6858E+03 |
| S6 | −4.0526E+02 | 6.3351E+02 | −5.6778E+02 | 2.2546E+02 |
| S7 | 4.4680E+02 | −5.3843E+02 | 3.6616E+02 | −1.0850E+02 |
| S8 | 2.0007E+01 | −1.7888E+01 | 8.2644E+00 | −1.5516E+00 |

TABLE 19

| AAS | AR | AP | BR | BP | CR |
|---|---|---|---|---|---|
| S9  | 1.6420E−01  | −7.3230E−03 | −4.4615E−01 | −6.3023E−03 | 3.0252E+00 |
| S10 | −7.7466E−01 | 7.7569E−03  | 3.5942E+00  | 1.8165E−03  | −8.7907E+00 |
| S11 | −3.5690E−01 | 9.8727E−03  | 8.3797E−01  | 5.3988E−03  | −1.2809E+00 |
| S12 | −1.9261E−01 | 2.3464E−02  | 2.3322E−01  | 1.6215E−02  | −1.9668E−01 |

| AAS | CP | DR | DP | ER |
|---|---|---|---|---|
| S9  | 2.9757E−04 | −9.3510E+00 | 3.5932E−04  | 1.5134E+01 |
| S10 | 2.0892E−05 | 1.4540E+01  | −7.6584E−05 | −1.5802E+01 |
| S11 | 1.0870E−03 | 1.2775E+00  | −2.5604E−04 | −8.7173E−01 |
| S12 | 8.7079E−03 | 1.0887E−01  | 3.9832E−03  | −4.0093E−02 |

| AAS | EP | FR | FP | GR | GP |
|---|---|---|---|---|---|
| S9  | 8.1605E−05  | −1.3969E+01 | 1.4863E−06  | 7.4520E+00  | 4.8787E−05 |
| S10 | 1.9588E−05  | 1.1011E+01  | 8.0636E−06  | −4.6840E+00 | −4.1506E−05 |
| S11 | −1.4929E−04 | 4.0681E−01  | 6.9613E−04  | −1.2561E−01 | 1.6075E−03 |
| S12 | 1.0570E−03  | 9.7195E−03  | −5.5747E−04 | −1.4903E−03 | −9.9413E−04 |

| AAS | HR | HP | JR | JP |
|---|---|---|---|---|
| S9  | −2.1470E+00 | 1.2053E−04  | 2.5976E−01  | 0.0000E+00 |
| S10 | 1.0923E+00  | −7.1926E−05 | −1.0421E−01 | 0.0000E+00 |
| S11 | 2.3443E−02  | 1.5549E−03  | −2.0167E−03 | 0.0000E+00 |
| S12 | 1.3132E−04  | −6.5273E−04 | −5.0905E−06 | 0.0000E+00 |

Table 20 shows effective focal lengths fy1 to fy6 in the Y-axis direction of each lens in Example 5, the effective focal length fx5 in the X-axis direction of the fifth lens E5, the effective focal length fx6 in the X-axis direction of the sixth lens E6, the effective focal length fx in the X-axis direction of the camera lens assembly, the effective focal length fy in the Y-axis direction of the camera lens assembly, a total optical length TTL of the camera lens assembly, the image heights IHx and IHy in the X-axis and Y-axis directions of the camera lens assembly, and the full field-of-views FOVx and FOVy in the X-axis and Y-axis directions of the camera lens assembly.

TABLE 20

| | | | |
|---|---|---|---|
| fy1 (mm) | −3.78 | fx (mm) | 2.20 |
| fy2 (mm) | 8.65  | fy (mm) | 2.20 |
| fy3 (mm) | 2.35  | TTL (mm) | 5.05 |
| fy4 (mm) | −5.85 | IHx (mm) | 1.74 |
| fy5 (mm) | 3.02  | IHy (mm) | 2.48 |
| fy6 (mm) | −9.54 | FOVx (°) | 76.5 |
| fx5 (mm) | 2.95  | FOVy (°) | 97.0 |
| fx6 (mm) | −8.69 | | |

Figure 14:
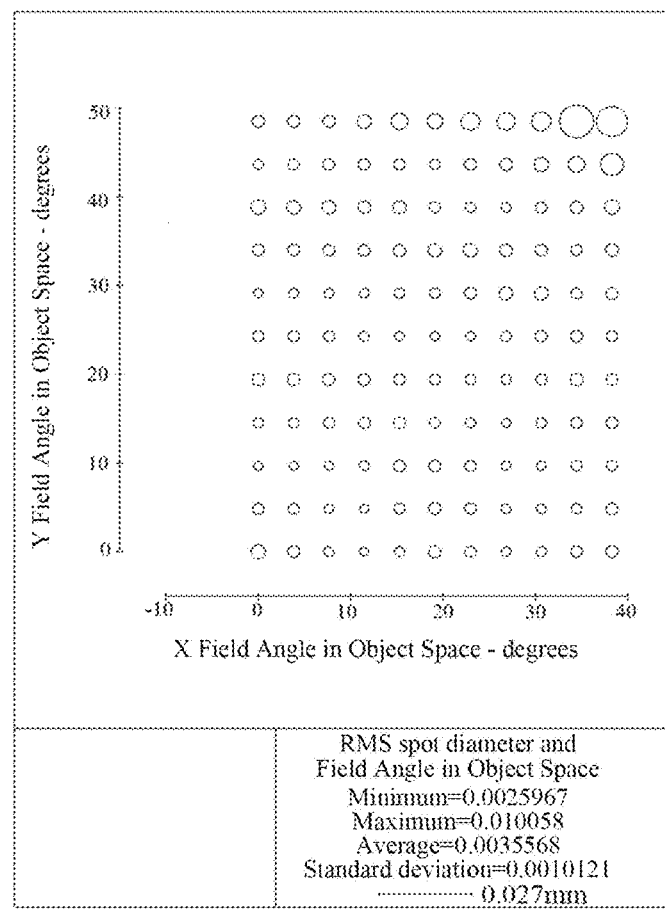
FIG. 14 schematically illustrates a situation where an RMS spot diameter of the camera lens assembly according to Example 5 is in a first quadrant.
Figure 15:
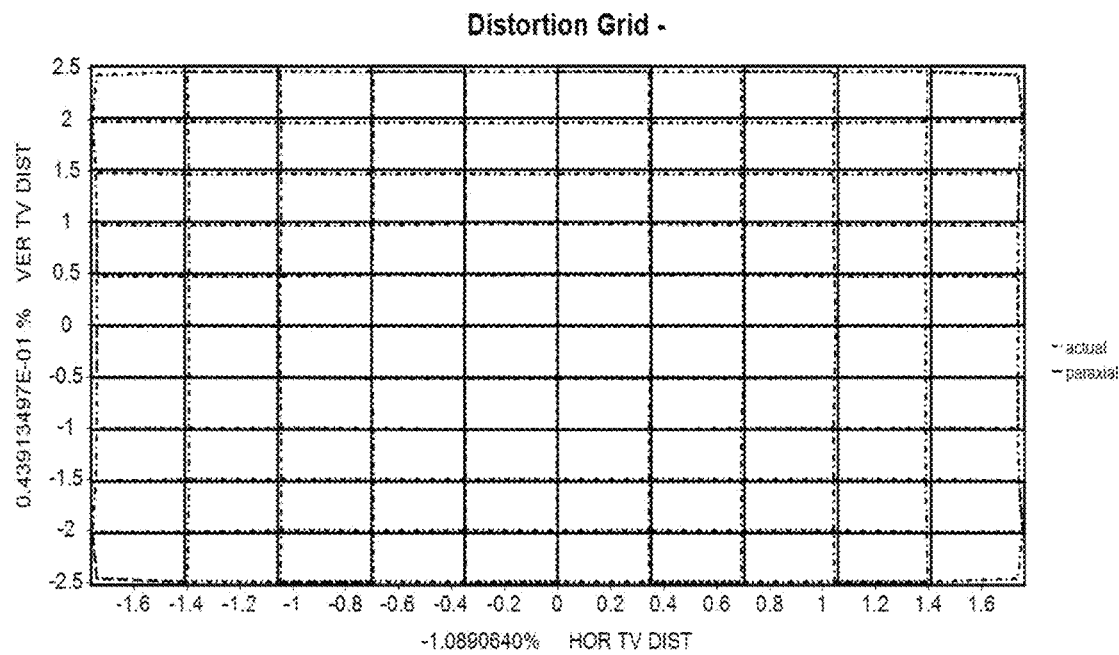
FIG. 15 illustrates a TV distortion diagram of the camera lens assembly according to Example 5 of the present disclosure.

FIG. 14 illustrates a size of an RMS spot diameter of the camera lens assembly according to Example 5 at different field-of-views in a first quadrant. FIG. 15 illustrates a TV distortion diagram of the camera lens assembly according to Example 5, representing a difference in distortion between real rays and paraxial rays in a vertical area and a horizontal area. According to FIG. 14 to FIG. 15, it can be seen that the camera lens assembly according to Example 5 can achieve good image quality.

Example 6

Figure 16:
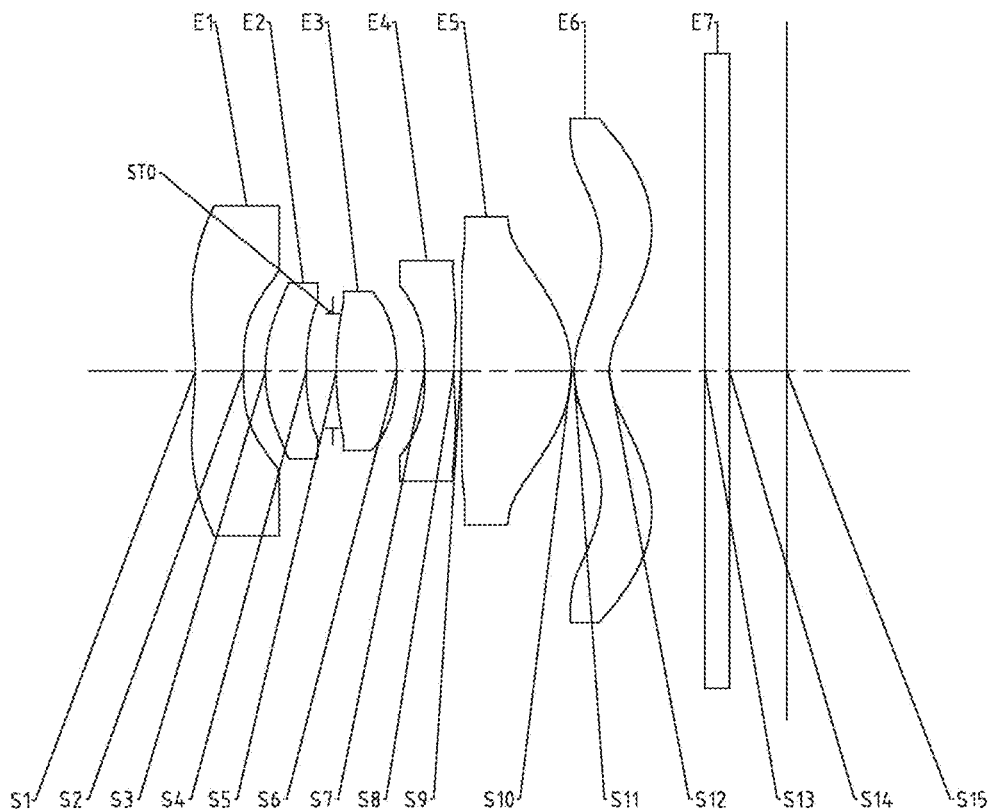
FIG. 16 illustrates a schematic structural diagram of a camera lens assembly according to Example 6 of the present disclosure.

A camera lens assembly according to Example 6 of the present disclosure is described below with reference to FIG. 16 to FIG. 18. FIG. 16 illustrates a schematic structural diagram of the camera lens assembly according to Example 6 of the present disclosure.

As shown in FIG. 16, the camera lens assembly according to an exemplary embodiment of the present disclosure includes, sequentially along an optical axis from an object side to an image side: a first lens E1, a second lens E2, a stop STO, a third lens E3, a fourth lens E4, a fifth lens E5, a sixth lens E6, an optical filter E7, and an imaging plane S15.

The first lens E1 has negative refractive power, an object-side surface S1 thereof thereof is a concave surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 21 shows the surface type, the radius of curvature X, the radius of curvature Y, the thickness, the material, the conic coefficient X and the conic coefficient Y of each lens of the camera lens assembly in Example 6. The radius of curvature X, the radius of curvature Y and the thickness are shown in millimeters (mm).

lens E1, the second lens E2, the third lens E3, the fourth lens E4, the fifth lens E5 and the sixth lens E6 are aspheric surfaces; and the image-side surface S12 of the sixth lens E6 is a non-rotationally symmetric aspheric surface.

Table 22 shows high-order coefficients applicable to each aspheric surface in Example 6, where each aspheric surface type may be defined by the formula (1) given in the above Example 1. Table 23 shows the rotationally symmetric components of the non-rotationally symmetric aspheric surface S12 and the higher-order coefficients of the non-rotationally symmetric components applicable to Example 6, where the non-rotationally symmetric aspheric surface

TABLE 21

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | spherical | infinite | | infinite | | | | |
| S1 | aspheric | −4.1611 | | 0.8227 | 1.536 | 55.74 | −31.7720 | |
| S2 | aspheric | 9.5257 | | 0.3793 | | | −10.6630 | |
| S3 | aspheric | 2.9562 | | 0.6988 | 1.645 | 23.49 | 0.3641 | |
| S4 | aspheric | 4.4828 | | 0.4583 | | | 1.8520 | |
| STO | spherical | infinite | | 0.0601 | | | | |
| S5 | aspheric | 5.7054 | | 1.0411 | 1.546 | 56.11 | 0.5279 | |
| S6 | aspheric | −3.4760 | | 0.4792 | | | 1.2114 | |
| S7 | aspheric | −10.6257 | | 0.5000 | 1.666 | 20.40 | 42.6964 | |
| S8 | aspheric | 5.4675 | | 0.1231 | | | −87.2362 | |
| S9 | aspheric | −316.1613 | | 1.8981 | 1.546 | 56.11 | −99.0000 | |
| S10 | aspheric | −1.9830 | | 0.0400 | | | −0.5292 | |
| S11 | aspheric | 1.5414 | | 0.6006 | 1.536 | 55.74 | −3.7671 | |
| S12(AAS) | aspheric | 1.1174 | 1.1162 | 1.6534 | | | −2.6425 | −2.6459 |
| S13 | aspheric | infinite | | 0.4200 | 1.517 | 64.2 | | |
| S14 | aspheric | infinite | | 0.9816 | | | | |
| S15 | spherical | infinite | | | | | | |

As can be seen from Table 21, in Example 6, the object-side surface and the image-side surface of any one of the first type may be defined by the formula (2) given in the above Example 1.

TABLE 22

| Surface number | A4 | A6 | A8 | A10 | A12 |
|---|---|---|---|---|---|
| S1 | 8.3566E−01 | −1.3548E−01 | 3.1780E−02 | −1.0435E−02 | 2.2621E−03 |
| S2 | 5.7062E−01 | −1.0042E−01 | 4.1546E−03 | −1.9245E−03 | 1.0616E−03 |
| S3 | −8.8987E−03 | −2.8649E−02 | 2.1634E−03 | 6.1224E−04 | 3.4539E−04 |
| S4 | 3.3821E−02 | 3.3303E−03 | 1.8001E−03 | 5.6898E−04 | 1.8015E−04 |
| S5 | 2.3581E−03 | −1.4452E−03 | −1.2423E−05 | −1.2546E−05 | 1.6067E−05 |
| S6 | −1.2040E−01 | 4.4852E−04 | −2.3354E−04 | 1.4241E−04 | −3.5107E−06 |
| S7 | −3.2344E−01 | 4.2018E−02 | −1.8017E−03 | 1.6433E−03 | −2.5583E−04 |
| S8 | −2.1767E−01 | 5.9241E−02 | −2.7553E−03 | −1.0596E−03 | 6.1395E−04 |
| S9 | 6.9480E−02 | −1.7877E−03 | 8.8279E−03 | −7.4453E−03 | 3.7928E−03 |
| S10 | 1.3246E+00 | 1.9865E−01 | 2.7868E−02 | 1.7331E−03 | 6.3908E−04 |
| S11 | −2.5409E+00 | 5.7712E−01 | −4.2233E−02 | 8.2299E−03 | −4.9451E−03 |

| Surface number | A14 | A16 | A18 | A20 |
|---|---|---|---|---|
| S1 | −8.6481E−04 | 1.4597E−04 | 0 | 0 |
| S2 | −3.4157E−05 | −5.1508E−06 | 0 | 0 |
| S3 | −6.3430E−05 | −2.2599E−05 | 0 | 0 |
| S4 | 3.4437E−05 | 1.2439E−05 | 0 | 0 |
| S5 | −6.0333E−06 | 2.6589E−06 | −4.4048E−06 | 1.9527E−06 |
| S6 | 9.3998E−06 | 4.6970E−06 | −9.6097E−06 | 4.9987E−06 |
| S7 | 1.9726E−04 | −4.1376E−05 | 1.7598E−05 | −1.8987E−05 |
| S8 | −1.4120E−04 | −1.1448E−05 | −4.6140E−06 | −2.3666E−05 |
| S9 | −1.5296E−03 | 3.6087E−04 | −1.4680E−04 | −3.7284E−06 |
| S10 | 3.6729E−03 | −5.2424E−04 | 2.9703E−04 | −2.2269E−04 |
| S11 | −3.7764E−03 | 2.1706E−03 | 9.0064E−04 | −5.3571E−04 |

TABLE 23

| AAS | AR | AP | BR | BP | CR |
|---|---|---|---|---|---|
| S12 | −3.7988E−02 | 7.8449E−04 | 8.0764E−03 | 2.3564E−04 | −1.5124E−03 |
| | AAS | CP | DR | DP | ER |
| | S12 | 4.7099E−05 | 2.0779E−04 | 5.7960E−06 | −1.9513E−05 |
| AAS | EP | FR | FP | GR | GP |
| S12 | 0.0000E+00 | 1.1999E−06 | 0.0000E+00 | −4.5667E−08 | 0.0000E+00 |
| | AAS | HR | HP | JR | JP |
| | S12 | 9.6399E−10 | 0.0000E+00 | −8.4915E−12 | 0.0000E+00 |

Table 24 shows effective focal lengths fy1 to fy6 in the Y-axis direction of each lens in Example 6, the effective focal length fx5 in the X-axis direction of the fifth lens E5, the effective focal length fx6 in the X-axis direction of the sixth lens E6, the effective focal length fx in the X-axis direction of the camera lens assembly, the effective focal length fy in the Y-axis direction of the camera lens assembly, a total optical length TTL of the camera lens assembly, the image heights IHx and IHy in the X-axis and Y-axis directions of the camera lens assembly, and the full field-of-views FOVx and FOVy in the X-axis and Y-axis directions of the camera lens assembly.

TABLE 24

| fy1 (mm) | −5.28 | fx (mm) | 3.74 |
|---|---|---|---|
| fy2 (mm) | 11.42 | fy (mm) | 3.73 |
| fy3 (mm) | 4.12 | TTL (mm) | 10.22 |
| fy4 (mm) | −5.35 | IHx (mm) | 3.50 |
| fy5 (mm) | 3.65 | IHy (mm) | 4.89 |
| fy6 (mm) | −14.98 | FOVx (°) | 87.5 |
| fx5 (mm) | 3.65 | FOVy (°) | 106.4 |
| fx6 (mm) | −14.88 | | |

Figure 17:
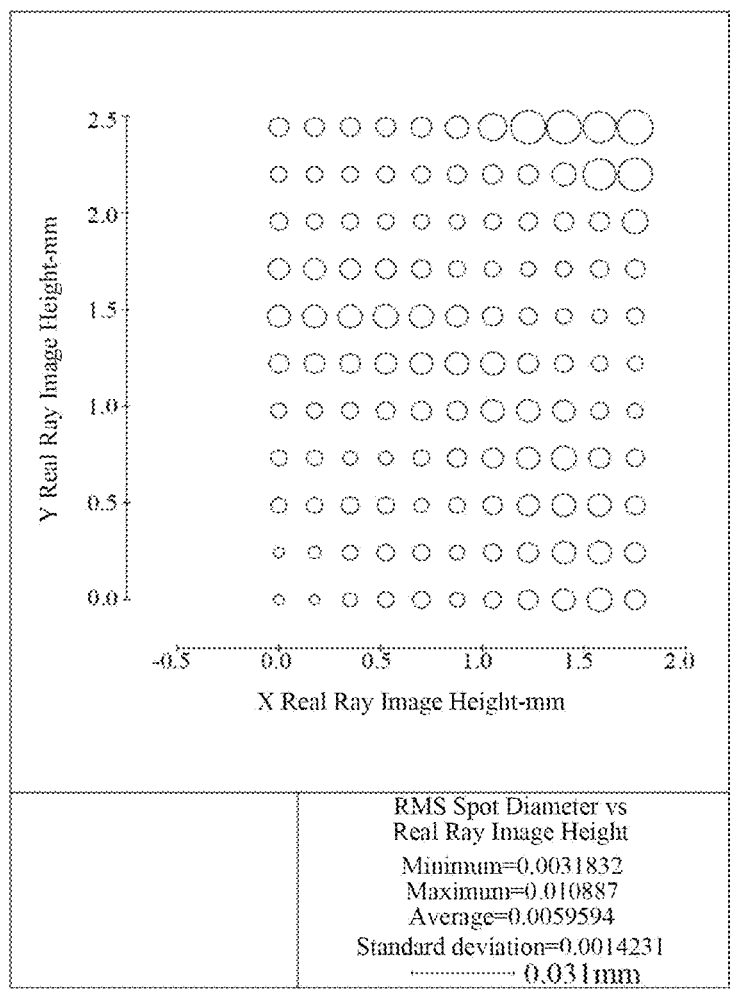
FIG. 17 schematically illustrates a situation where an RMS spot diameter of the camera lens assembly according to Example 6 is in a first quadrant.
Figure 18:
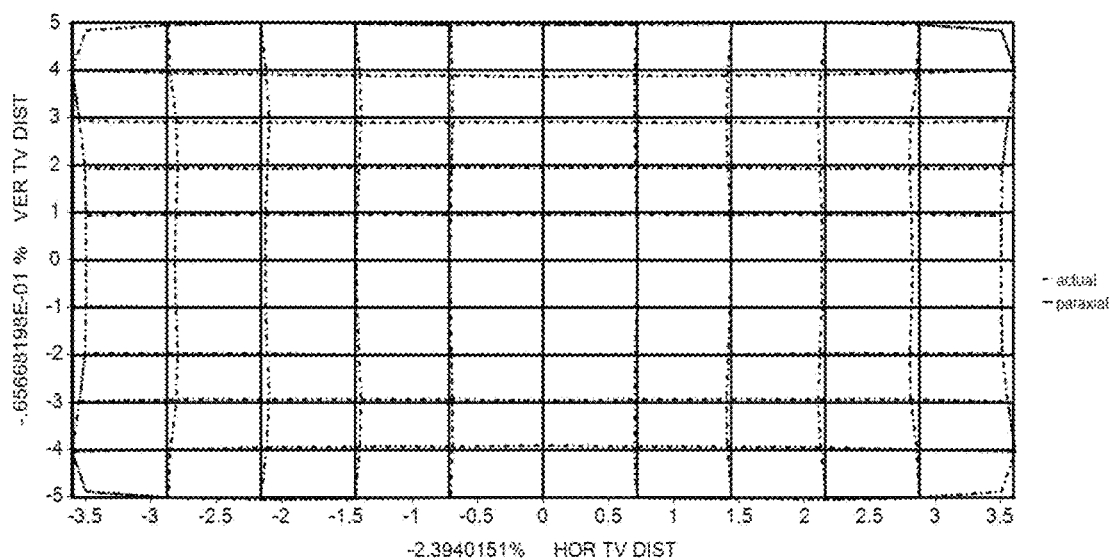
FIG. 18 illustrates a TV distortion diagram of the camera lens assembly according to Example 6 of the present disclosure.

FIG. 17 illustrates a size of an RMS spot diameter of the camera lens assembly according to Example 6 at different image height positions in a first quadrant. FIG. 18 illustrates a TV distortion diagram of the camera lens assembly according to Example 6, representing a difference in distortion between real rays and paraxial rays in a vertical area and a horizontal area. According to FIG. 17 to FIG. 18, it can be seen that the camera lens assembly according to Example 6 can achieve good image quality.

Example 7

Figure 19:
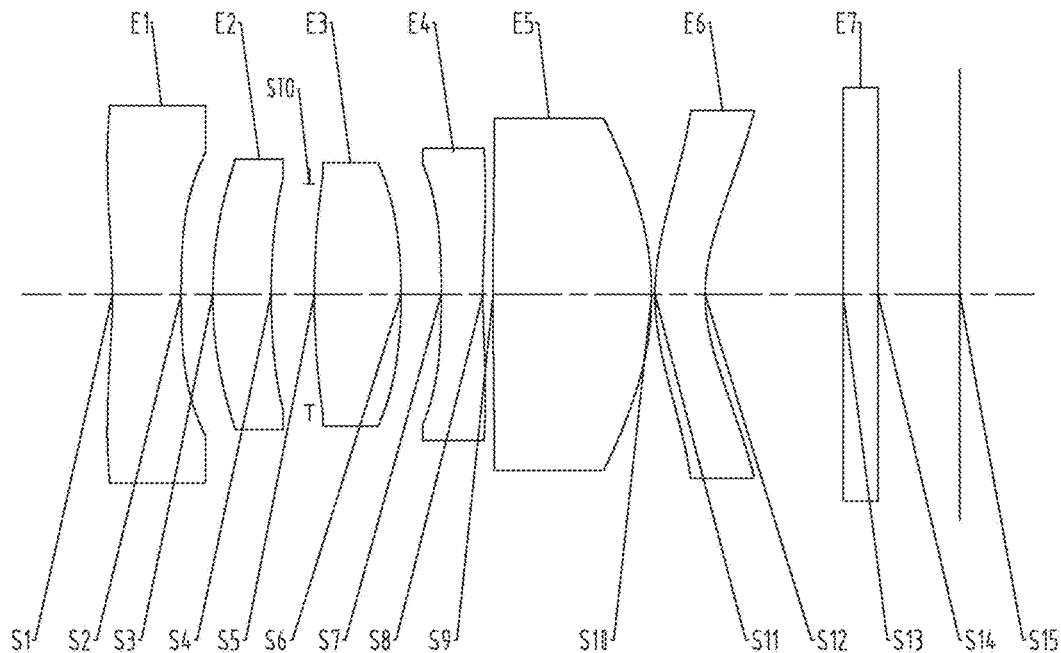
FIG. 19 illustrates a schematic structural diagram of a camera lens assembly according to Example 7 of the present disclosure.

A camera lens assembly according to Example 7 of the present disclosure is described below with reference to FIG. 19 to FIG. 21. FIG. 19 illustrates a schematic structural diagram of the camera lens assembly according to Example 7 of the present disclosure.

As shown in FIG. 19, the camera lens assembly according to an exemplary embodiment of the present disclosure includes, sequentially along an optical axis from an object side to an image side: a first lens E1, a second lens E2, a stop STO, a third lens E3, a fourth lens E4, a fifth lens E5, a sixth lens E6, an optical filter E7, and an imaging plane S15.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 25 shows the surface type, the radius of curvature X, the radius of curvature Y, the thickness, the material, the conic coefficient X and the conic coefficient Y of each lens of the camera lens assembly in Example 7. The radius of curvature X, the radius of curvature Y and the thickness are shown in millimeters (mm).

TABLE 25

| | | | | | Material | | | |
|---|---|---|---|---|---|---|---|---|
| Surface number | Surface type | Radius of curvature Y | Radius of curvature X | Thickness | Refractive index | Abbe number | Conic coefficient Y | Conic coefficient X |
| OBJ | spherical | infinite | | infinite | | | | |
| S1 | aspheric | −6.2416 | | 1.2341 | 1.536 | 55.74 | −31.7720 | |
| S2 | aspheric | 14.2886 | | 0.5689 | | | −10.6630 | |
| S3 | aspheric | 4.4342 | | 1.0481 | 1.645 | 23.49 | 0.3641 | |
| S4 | aspheric | 6.7241 | | 0.6874 | | | 1.8520 | |
| STO | spherical | infinite | | 0.0901 | | | | |
| S5 | aspheric | 8.5581 | | 1.5616 | 1.546 | 56.11 | 0.5279 | |
| S6 | aspheric | −5.2140 | | 0.7187 | | | 1.2114 | |

TABLE 25-continued

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| S7 | aspheric | −15.9386 | | 0.7500 | 1.666 | 20.40 | 42.6964 | |
| S8 | aspheric | 8.2013 | | 0.1847 | | | −87.2362 | |
| S9 | aspheric | −474.2419 | | 2.8472 | 1.546 | 56.11 | −99.0000 | |
| S10 | aspheric | −2.9745 | | 0.0600 | | | −0.5292 | |
| S11 | aspheric | 2.3120 | | 0.9008 | 1.536 | 55.74 | −3.7671 | |
| S12(AAS) | aspheric | 1.6761 | 1.6743 | 2.4800 | | | −2.6425 | −2.6459 |
| S13 | aspheric | infinite | | 0.6300 | 1.517 | 64.2 | | |
| S14 | aspheric | infinite | | 1.4724 | | | | |
| S15 | spherical | infinite | | | | | | |

As can be seen from Table 25, in Example 7, the object-side surface and the image-side surface of any one of the first lens E1, the second lens E2, the third lens E3, the fourth lens E4 and the fifth lens E5, and the object-side surface S11 of the sixth lens E6 are aspheric surfaces; and the image-side surface S12 of the sixth lens E6 is a non-rotationally symmetric aspheric surface.

Table 26 shows high-order coefficients applicable to each aspheric surface in Example 7, where each aspheric surface type may be defined by the formula (1) given in the above Example 1. Table 27 shows the rotationally symmetric components of the non-rotationally symmetric aspheric surface S12 and the higher-order coefficients of the non-rotationally symmetric components applicable to Example 7, where the non-rotationally symmetric aspheric surface type may be defined by the formula (2) given in the above Example 1.

TABLE 26

| Surface number | A4 | A6 | A8 | A10 | A12 |
|---|---|---|---|---|---|
| S1 | 1.2535E+00 | −2.0322E−01 | 4.7670E−02 | −1.5653E−02 | 3.3932E−03 |
| S2 | 8.5593E−01 | −1.5063E−01 | 6.2319E−03 | −2.8867E−03 | 1.5924E−03 |
| S3 | −1.3348E−02 | −4.2973E−02 | 3.2451E−03 | 9.1835E−04 | 5.1808E−04 |
| S4 | 5.0732E−02 | 4.9954E−03 | 2.7002E−03 | 8.5347E−04 | 2.7022E−04 |
| S5 | 3.5371E−03 | −2.1679E−03 | −1.8635E−05 | −1.8818E−05 | 2.4101E−05 |
| S6 | −1.8060E−01 | 6.7278E−04 | −3.5031E−04 | 2.1362E−04 | −5.2660E−06 |
| S7 | −4.8516E−01 | 6.3026E−02 | −2.7025E−03 | 2.4649E−03 | −3.8375E−04 |
| S8 | −3.2651E−01 | 8.8861E−02 | −4.1330E−03 | −1.5894E−03 | 9.2093E−04 |
| S9 | 1.0422E−01 | −2.6816E−03 | 1.3242E−02 | −1.1168E−02 | 5.6893E−03 |
| S10 | 1.9869E+00 | 2.9798E−01 | 4.1802E−02 | 2.5996E−03 | 9.5863E−04 |
| S11 | −3.8114E+00 | 8.6569E−01 | −6.3349E−02 | 1.2345E−02 | −7.4176E−03 |

| Surface number | A14 | A16 | A18 | A20 |
|---|---|---|---|---|
| S1 | −1.2972E−03 | 2.1895E−04 | 0 | 0 |
| S2 | −5.1236E−05 | −7.7262E−06 | 0 | 0 |
| S3 | −9.5144E−05 | −3.3898E−05 | 0 | 0 |
| S4 | 5.1656E−05 | 1.8658E−05 | 0 | 0 |
| S5 | −9.0500E−06 | 3.9883E−06 | −6.6072E−06 | 2.9291E−06 |
| S6 | 1.4100E−05 | 7.0455E−06 | −1.4415E−05 | 7.4981E−06 |
| S7 | 2.9589E−04 | −6.2064E−05 | 2.6398E−05 | −2.8480E−05 |
| S8 | −2.1180E−04 | −1.7172E−05 | −6.9210E−06 | −3.5499E−05 |
| S9 | −2.2945E−03 | 5.4130E−04 | −2.2020E−04 | −5.5926E−06 |
| S10 | 5.5093E−03 | −7.8636E−04 | 4.4555E−04 | −3.3404E−04 |
| S11 | −5.6646E−03 | 3.2559E−03 | 1.3510E−03 | −8.0356E−04 |

TABLE 27

| AAS | AR | AP | BR | BP | CR |
|---|---|---|---|---|---|
| S12 | −1.1256E−02 | 7.8449E−04 | 1.0636E−03 | 2.3564E−04 | −8.8517E−05 |
| | AAS | CP | DR | DP | ER |
| | S12 | 4.7099E−05 | 5.4050E−06 | 5.7960E−06 | −2.2559E−07 |
| AAS | EP | FR | FP | GR | GP |
| S12 | 0.0000E+00 | 6.1653E−09 | 0.0000E+00 | −1.0429E−10 | 0.0000E+00 |

TABLE 27-continued

| | AAS | HR | HP | JR | JP |
|---|---|---|---|---|---|
| S12 | | 9.7841E−13 | 0.0000E+00 | −3.8305E−15 | 0.0000E+00 |

Table 28 shows effective focal lengths fy1 to fy6 in the Y-axis direction of each lens in Example 7, the effective focal length fx5 in the X-axis direction of the fifth lens E5, the effective focal length fx6 in the X-axis direction of the sixth lens E6, the effective focal length fx in the X-axis direction of the camera lens assembly, the effective focal length fy in the Y-axis direction of the camera lens assembly, a total optical length TTL of the camera lens assembly, the image heights IHx and IHy in the X-axis and Y-axis directions of the camera lens assembly, and the full field-of-views FOVx and FOVy in the X-axis and Y-axis directions of the camera lens assembly.

TABLE 28

| fy1 (mm) | −7.93 | fx (mm) | 5.61 |
|---|---|---|---|
| fy2 (mm) | 17.13 | fy (mm) | 5.60 |
| fy3 (mm) | 6.18 | TTL (mm) | 15.33 |
| fy4 (mm) | −8.03 | IHx (mm) | 1.75 |
| fy5 (mm) | 5.47 | IHy (mm) | 2.44 |
| fy6 (mm) | −22.47 | FOVx (°) | 34.9 |
| fx5 (mm) | 5.47 | FOVy (°) | 47.3 |
| fx6 (mm) | −22.32 | | |

Figure 20:
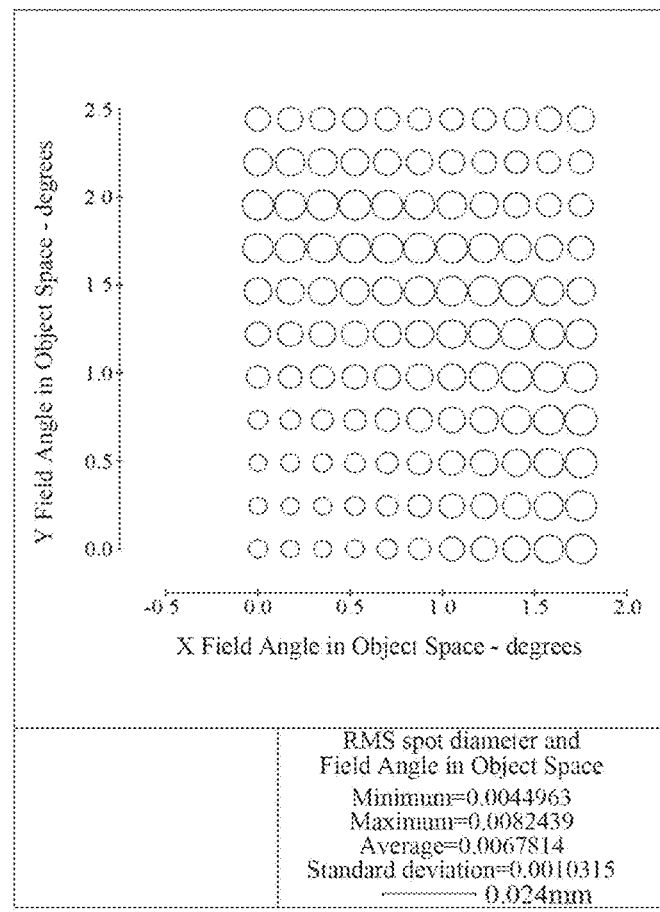
FIG. 20 schematically illustrates a situation where an RMS spot diameter of the camera lens assembly according to Example 7 is in a first quadrant.
Figure 21:
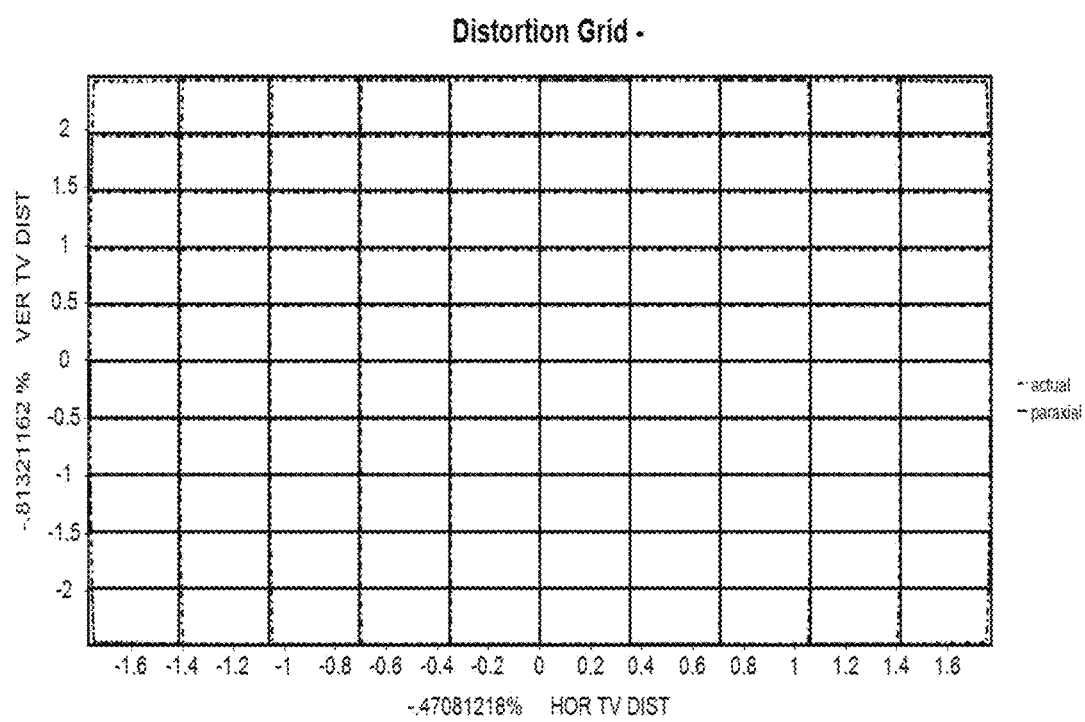
FIG. 21 illustrates a TV distortion diagram of the camera lens assembly according to Example 7 of the present disclosure.

FIG. 20 illustrates a size of an RMS spot diameter of the camera lens assembly according to Example 7 at different image height positions in a first quadrant. FIG. 21 illustrates a TV distortion diagram of the camera lens assembly according to Example 7, representing a difference in distortion between real rays and paraxial rays in a vertical area and a horizontal area. According to FIG. 20 to FIG. 21, it can be seen that the camera lens assembly according to Example 7 can achieve good image quality.

In view of the above, examples 1 to 7 respectively satisfy the relationships shown in Table 29 below.

TABLE 29

| | Example | | | | | | |
|---|---|---|---|---|---|---|---|
| Conditional | 1 | 2 | 3 | 4 | 5 | 6 | 7 |
| $\sqrt{IH_x^2 + IH_y^2}$ (mm) | 3.01 | 3.02 | 3.02 | 3.01 | 3.03 | 6.00 | 3.01 |
| fy2/fy3 | 3.46 | 4.12 | 4.60 | 4.57 | 3.69 | 2.77 | 2.77 |
| fx5/fx6 | −0.21 | −0.35 | −0.35 | −0.34 | −0.34 | −0.25 | −0.25 |
| fy1/fy2 | −0.39 | −0.44 | −0.41 | −0.41 | −0.44 | −0.46 | −0.46 |
| fy/R1 | −0.87 | −0.58 | −0.57 | −0.55 | −0.67 | −0.90 | −0.90 |
| tan(FOVx/2) * tan(FOVy/2) | 1.45 | 0.89 | 0.91 | 0.91 | 0.89 | 1.28 | 0.14 |

The present disclosure further provides a camera apparatus, having a photosensitive element which may be a photosensitive charge-coupled device (CCD) or a complementary metal-oxide semiconductor (CMOS). The camera apparatus may be an independent camera device such as a digital camera, or may be a camera module integrated in a mobile electronic device such as a mobile phone. The camera apparatus is equipped with the camera lens assembly described above.

The above disclosure is provided just to describe the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any other combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, comprising a first lens, a second lens, a third lens, a fourth lens, a fifth lens and a sixth lens, which all have refractive power and are sequentially arranged from an object side to an image side along an optical axis, wherein,
    the first lens and the sixth lens have negative refractive power;
    the third lens and the fifth lens have positive refractive power;
    at least one of the first lens to the sixth lens has a non-rotationally symmetric aspheric surface; and
    wherein tan(FOVx/2)*tan(FOVy/2)<2.0, where FOVx is a full field-of-view of the camera lens assembly in an X-axis direction and FOVy is a full field-of-view of the camera lens assembly in a Y-axis direction, and values of FOVx and FOVy are different, wherein
    an object-side surface of the second lens is a convex surface, an image-side surface of the second lens is a concave surface, and an object-side surface of the fourth lens is a concave surface.

2. The camera lens assembly according to claim 1, wherein $$\sqrt{IH_x^2 + IH_y^2} \leq 6.0 \text{ mm},$$

where, IHx is an image height of the camera lens assembly in an X-axis direction, and IHy is an image height of the camera lens assembly in a Y-axis direction.

3. The camera lens assembly according to claim 1, wherein 3.0<fy2/fy3<5.0, where fy2 is an effective focal length of the second lens in a Y-axis direction and fy3 is an effective focal length of the third lens in the Y-axis direction.

4. The camera lens assembly according to claim 1, wherein −0.5<fx5/fx6<0, where fx5 is an effective focal length of the fifth lens in an X-axis direction and fx6 is an effective focal length of the sixth lens in the X-axis direction.

5. The camera lens assembly according to claim 1, wherein −0.5<fy1/fy2<0, where fy1 is an effective focal length of the first lens in a Y-axis direction and fy2 is an effective focal length of the second lens in the Y-axis direction.

6. The camera lens assembly according to claim 1, wherein an object-side surface of the first lens is a concave surface; and wherein $-1.0 < fy/R1 < 0$, where fy is an effective focal length of the camera lens assembly in a Y-axis direction and R1 is a radius of curvature of the object-side surface of the first lens.

* * * * *